US010742822B2

(12) United States Patent
Meredith et al.

(10) Patent No.: US 10,742,822 B2
(45) Date of Patent: Aug. 11, 2020

(54) MOBILE NETWORK HANDLING OF SIMULTANEOUS USAGE SESSIONS

(71) Applicant: AT&T Intellectual Property I, L.P., Atlanta, GA (US)

(72) Inventors: Sheldon Meredith, Roswell, GA (US); William C. Cottrill, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/224,371

(22) Filed: Dec. 18, 2018

(65) Prior Publication Data
US 2020/0195785 A1    Jun. 18, 2020

(51) Int. Cl.
*H04W 28/18*   (2009.01)
*H04M 15/00*   (2006.01)
*H04L 12/14*   (2006.01)

(52) U.S. Cl.
CPC .... *H04M 15/8228* (2013.01); *H04L 12/1407* (2013.01); *H04M 15/58* (2013.01); *H04M 15/8214* (2013.01)

(58) Field of Classification Search
CPC ..... H04W 28/18; H04W 80/00; H04W 88/04; H04W 88/06
See application file for complete search history.

(56) References Cited

U.S. PATENT DOCUMENTS

| | | | |
|---|---|---|---|
| 7,725,944 B2 | 5/2010 | Spalink et al. | |
| 9,497,091 B2 | 11/2016 | Smith et al. | |
| 10,083,159 B1 | 9/2018 | Bekmambetov et al. | |
| 2002/0078191 A1 | 6/2002 | Lorenz | |
| 2004/0073644 A1 | 4/2004 | Koch et al. | |
| 2007/0070969 A1 | 3/2007 | Malomsoky et al. | |
| 2014/0080447 A1 | 3/2014 | Janakiraman | |
| 2014/0366125 A1* | 12/2014 | Murata | G06F 21/44 726/17 |
| 2016/0094577 A1* | 3/2016 | Shih | H04L 63/10 726/25 |
| 2017/0230260 A1 | 8/2017 | Gueta et al. | |

OTHER PUBLICATIONS

Huang et al., "Parallel Browsing Behavior on the Web," HT '10, Proceedings of the 21$^{st}$ ACM Conference on Hypertext and Hypermedia, Jun. 13-16, 2010, ACM 2010.

* cited by examiner

*Primary Examiner* — Sam Bhattacharya
(74) *Attorney, Agent, or Firm* — Hartman & Citrin LLC

(57) ABSTRACT

Concepts and technologies are disclosed herein for mobile network handling of simultaneous data usage session records. A system can include a network session server that has a processor and a memory storing instructions that configure a processor to perform operations. The operations can include obtaining, from a session probe within a core network device, a raw mobile data set associated with a user equipment. The operations can include determining that the user equipment engages in a simultaneous usage session based on the raw mobile data set. The operations can include identifying targeted domains that are present within the raw mobile data set, and creating a raw session record for each of the targeted domains associated with the simultaneous usage session.

20 Claims, 8 Drawing Sheets

MOBILE NETWORK HANDLING OF SIMULTANEOUS USAGE SESSIONS

BACKGROUND

Within a relatively short period of time, the use of mobile communication devices (e.g., smartphones, tablets, or other user equipment) has become prevalent, thereby allowing users to communicate in various geographical locations using the same mobile communication device. Because of the ubiquity of these devices, modern users may carry their device with them the majority of the day and the various communication devices of the user may be in a powered-on state, irrespective of whether the user is actively using the device. In various instances, some mobile communication devices may be executing one or more applications that communicate with a mobile network while the device is in an active and/or dormant state. The rise of memory storage devices has increased the storage capacity of many communication devices, which in turn can enable the storage, installation, and execution of a greater number of applications on a mobile communication device. As mobile network throughput has increased, so too has the number of applications communicating with the network. In some instances, users subscribe to a mobile network service that provides communicative coupling for their mobile communication devices. The user may subscribe to a network service that permits a certain amount of data usage allotment for a given time period. Some applications may communicate with the network even when executing in the background of the mobile communication device, and thus the user may be unaware of the amount of data usage. As such, the increased amount of data traffic between any one mobile communication device and a mobile network can strain network resources and contribute to network traffic congestion.

SUMMARY

The present disclosure is directed to mobile network handling of a simultaneous usage session that provides cotemporal data usage sessions. As used herein, the term "cotemporal," such as with respect to data usage sessions, refers to two or more instances of a data usage session, or other data, which exist or otherwise are occurring at the same time, such as on a user equipment and/or with a network. According to one aspect of the concepts and technologies disclosed herein, a method is disclosed. The method can include obtaining, by a processor of a network session server, from a session probe within a core network device, a raw mobile data set associated with a user equipment. The method can include determining, by the processor, that the user equipment engages in a simultaneous usage session based on the raw mobile data set. The method can further include identifying, by the processor, targeted domains that are present within the raw mobile data set. The method can further include creating, by the processor, a raw session record for each of the targeted domains associated with the simultaneous usage session. In some embodiments, the simultaneous usage session can include a plurality of data usage sessions that occur cotemporally on the user equipment. In some embodiments, each of the plurality of data usage sessions include a plurality of initiated request strings and a plurality of unsolicited request strings that are provided to a network. In some embodiments, the plurality of initiated request strings and the plurality of unsolicited request strings from the plurality of data usage sessions are intermingled within the raw mobile data set. In some embodiments, the core network device can include one or more of a multi-service proxy, a router, a packet data network gateway, a session management function, or a user plane function.

In some embodiments, the method can further include determining, by the processor, that one or more first branch domains corresponds with a first targeted domain for the raw mobile data set, and determining, by the processor, that one or more second branch domains corresponds with a second targeted domain for the raw mobile data set. The method can further include creating, by the processor, a first targeted domain session identifier for the first targeted domain and the one or more first branch domains, and creating, by the processor, a second targeted domain session identifier for the second targeted domain and the one or more second branch domains. The method can further include generating, by the processor, raw data records for a first raw session record based on the first targeted domain session identifier, and generating, by the processor, raw data records for a second raw session record based on the second targeted domain session identifier.

In some embodiments, the method can include identifying, by the processor, initiated request strings and one or more unsolicited strings within the raw mobile data set. In some embodiments, the method can include appending, by the processor, the first targeted domain session identifier to the initiated request strings that correspond with one of the first targeted domain or the one or more first branch domains, where appending the first targeted domain session identifier generates raw data records for a raw usage session corresponding to the first targeted domain. In some embodiments, the method can include appending, by the processor, the second targeted domain session identifier to initiated request strings that correspond with one of the second targeted domain or the one or more second branch domains, where appending the second targeted domain session identifier generates raw data records for the second targeted domain. In some embodiments, the method can include incorporating, by the processor, the raw data records for the first targeted domain within a first raw session record, and incorporating, by the processor, the raw data records for the second targeted domain within a second raw session record.

In some embodiments, the method can further include finalizing the raw session record for each of the targeted domains based on a respective raw session timeout period, and in response to finalizing the raw session record for each of the targeted domains, the method can further include providing, by the processor, the raw session record to a data lake that is accessible to a data tonnage assessment service and a simultaneous session analysis service.

According to another aspect of the concepts and technologies disclosed herein, a system is disclosed. In some embodiments, the system can be embodied as a network session server. The system can include a processor and a memory. The memory can store computer-executable instructions that, when executed by the processor, cause the processor to perform operations. The operations can include obtaining, from a session probe within a core network device, a raw mobile data set associated with a user equipment. The operations can include determining that the user equipment engages in a simultaneous usage session based on the raw mobile data set. The operations can include identifying targeted domains that are present within the raw mobile data set. The operations can include creating a raw session record for each of the targeted domains associated with the simultaneous usage session. In some embodiments, the simultaneous usage session includes a plurality of data usage sessions that occur cotemporally on the user equipment. In some embodiments, each of the plurality of data usage sessions includes a plurality of initiated request strings and a plurality of unsolicited request strings that are provided to a network. In some embodiments, the plurality of initiated request strings and the plurality of unsolicited request strings from the plurality of data usage sessions are intermingled within the raw mobile data set. In some embodiments, the core network device can include one or more of a multi-service proxy, a core router, a packet data network gateway, a session management function, or a user plane function.

In some embodiments, the operations can further include determining that one or more first branch domains corresponds with a first targeted domain for the raw mobile data set, and determining that one or more second branch domains corresponds with a second targeted domain for the raw mobile data set. The operations can further include creating a first targeted domain session identifier for the first targeted domain and the one or more first branch domains, and creating a second targeted domain session identifier for the second targeted domain and the one or more second branch domains. The operations can further include generating raw data records for a first raw session record based on the first targeted domain session identifier, and generating raw data records for a second raw session record based on the second targeted domain session identifier.

In some embodiments, the operations can include identifying initiated request strings and one or more unsolicited strings within the raw mobile data set. In some embodiments, the operations can include appending the first targeted domain session identifier to the initiated request strings that correspond with one of the first targeted domain or the one or more first branch domains, where appending the first targeted domain session identifier generates raw data records for a raw usage session corresponding to the first targeted domain. In some embodiments, the operations can include appending the second targeted domain session identifier to initiated request strings that correspond with one of the second targeted domain or the one or more second branch domains, where appending the second targeted domain session identifier generates raw data records for the second targeted domain. In some embodiments, the operations can include incorporating the raw data records for the first targeted domain within a first raw session record, and incorporating the raw data records for the second targeted domain within a second raw session record.

In some embodiments, the operations can further include finalizing the raw session record for each of the targeted domains based on a respective raw session timeout period, and in response to finalizing the raw session record for each of the targeted domains, the operations can further include providing the raw session record to a data lake that is accessible to a data tonnage assessment service and a simultaneous session analysis service.

According to yet another aspect, a computer storage medium is disclosed. The computer storage medium can have computer-executable instructions stored thereon. The computer-executable instructions can be associated with a simultaneous session analysis service of a network, such as via a network session server. When the computer-executable instructions are executed by a processor, the processor can perform operations. In some embodiments, the processor can be included in a computer system that supports the simultaneous session analysis service. The operations can include obtaining, from a session probe within a core network device, a raw mobile data set associated with a user equipment. The operations can include determining that the user equipment engages in a simultaneous usage session based on the raw mobile data set. The operations can further include identifying targeted domains that are present within the raw mobile data set, and creating a raw session record for each of the targeted domains associated with the simultaneous usage session.

In some embodiments, the simultaneous usage session can include a plurality of data usage sessions that occur cotemporally on the user equipment. In some embodiments, each of the plurality of data usage sessions includes a plurality of initiated request strings and a plurality of unsolicited request strings that are provided to a network. In some embodiments, the plurality of initiated request strings and the plurality of unsolicited request strings from the plurality of data usage sessions are intermingled within the raw mobile data set.

In some embodiments, the operations can further include determining that one or more first branch domains corresponds with a first targeted domain for the raw mobile data set, and determining that one or more second branch domains corresponds with a second targeted domain for the raw mobile data set. The operations can further include creating a first targeted domain session identifier for the first targeted domain and the one or more first branch domains, and creating a second targeted domain session identifier for the second targeted domain and the one or more second branch domains. The operations can further include generating raw data records for a first raw session record based on the first targeted domain session identifier, and generating raw data records for a second raw session record based on the second targeted domain session identifier.

In some embodiments, the operations can include identifying initiated request strings and one or more unsolicited strings within the raw mobile data set. In some embodiments, the operations can include appending the first targeted domain session identifier to the initiated request strings that correspond with one of the first targeted domain or the one or more first branch domains, where appending the first targeted domain session identifier generates raw data records for a raw usage session corresponding to the first targeted domain. In some embodiments, the operations can include appending the second targeted domain session identifier to initiated request strings that correspond with one of the second targeted domain or the one or more second branch domains, where appending the second targeted domain session identifier generates raw data records for the second targeted domain. In some embodiments, the operations can include incorporating the raw data records for the first targeted domain within a first raw session record, and incorporating the raw data records for the second targeted domain within a second raw session record.

In some embodiments, the operations can further include finalizing the raw session record for each of the targeted domains based on a respective raw session timeout period, and in response to finalizing the raw session record for each of the targeted domains, providing the raw session record to a data lake that is accessible to a data tonnage assessment service and a simultaneous session analysis service.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
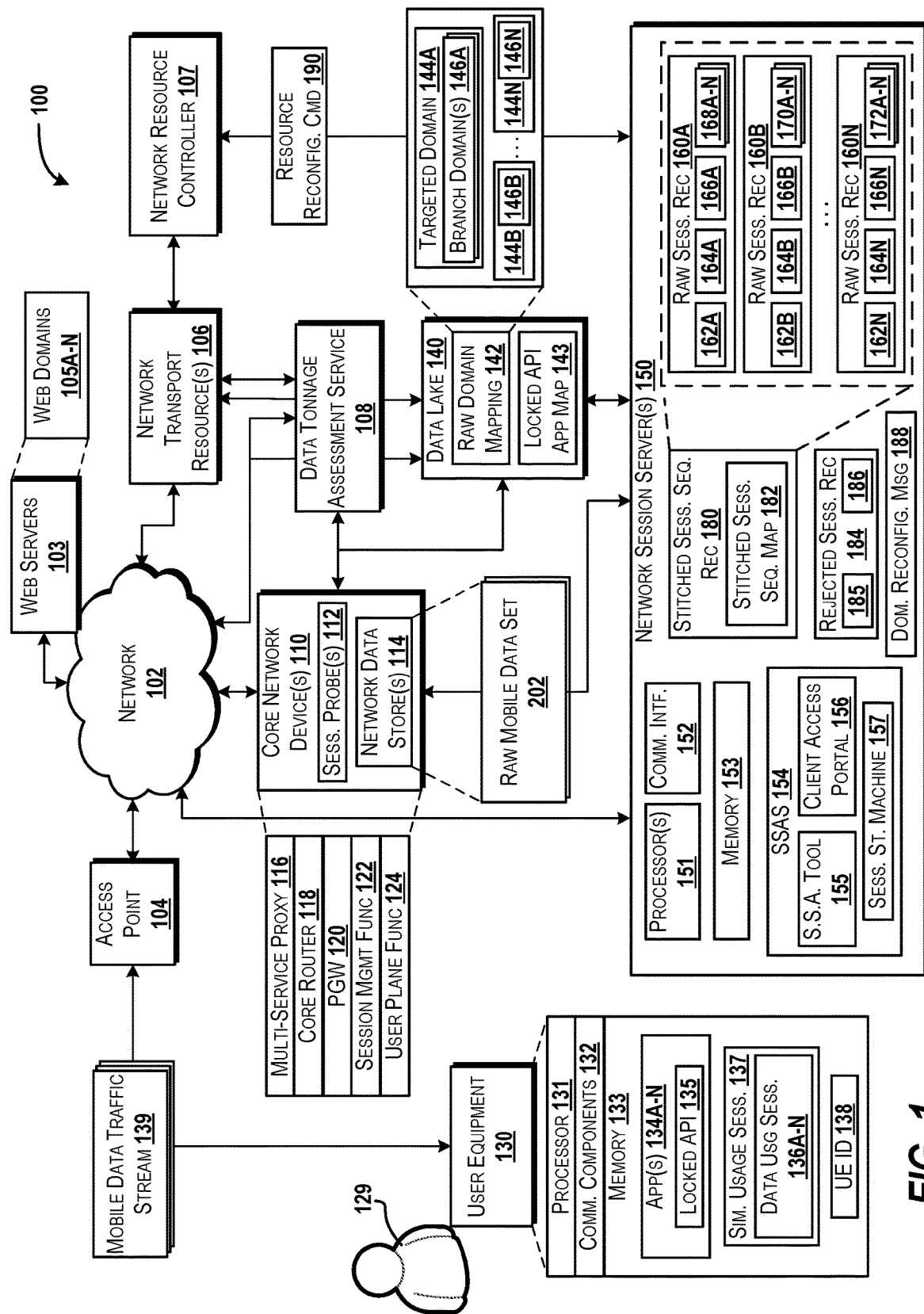
FIG. 1 is a system diagram showing an illustrative operating environment for various embodiments of the concepts and technologies described herein.

The following detailed description is directed to mobile network handling of simultaneous usage sessions, according to various embodiments of the present disclosure. In some instances, a user may subscribe or otherwise have access to a network that provides communication services so as to enable their user equipment to interact with and facilitate access to various web domains. The network can include a radio access network and a core network, along with various network devices and network functions. The mobile network may include one or more access points that facilitate wireless communicative coupling across one, two, or more communication channels via various radio technology interfaces, such as but not limited to a New Radio ("NR") interface that can conform to an industry standard and/or specification (e.g., a Third Generation Partnership Project Release 15 or later). The core network can include one or more core network devices that provide access, routing, and transport resources to various web domains supported by one or more web server. When a user equipment seeks to engage with multiple web domains, a mobile data traffic stream can facilitate transfer of data packets pertaining to a plurality of data usage sessions. The data usage sessions between the user equipment and the network may occur cotemporally so as to create a simultaneous usage session. A network session server can be communicatively coupled to a core network device and allow for handling and analysis of the simultaneous usage session without impeding routing through the network to a web server. In some embodiments, the data usage sessions may be directed to the same or different web domain which, in turn, is supported by one or more web servers.

In some embodiments, a web server may conform to a representational state transfer "REST" architecture such that the web server does not store any state information about a data usage session from a client (e.g., the user equipment) on the server side, which may be referred to as a statelessness restriction. This means that each request (from the user equipment to the web server) associated with the data usage sessions (which collectively make up the simultaneous usage session) is configured to include all of the information necessary for the web server to understand the request and, therefore, the web server does not refer to or rely on any stored context regarding the state of the user equipment on the web server. As such, the web server may be configured so that session state may be kept entirely on the user equipment. This can improve multiple technical aspects, such as improved visibility of information for the web server so that the full nature of the request can be determined by analyzing the request without the web server looking beyond the request; improved web server reliability due to quicker recovery from partial operating failures; and improved computing resource scalability because the lack of storing session state information on the web server can reduce hardware resource usage and simplify implementation because the web server does not have to manage resource usage across requests from multiple data usage sessions. The statelessness of the web server can improve scaling of application programming interfaces to many concurrent users (e.g., millions of user equipment) by deploying multiple server resources so that any web server can handle a request from the data usage session because there is no session-related dependency.

Therefore, communication service providers may configure network core devices to enable web servers to continue operation using the REST architecture. However, the stateless constraint on the web server side may decrease network performance due to an increase in data usage sessions (which may include repetitive data that increases per-interaction overhead), which can be because data cannot be left on the web server in a shared context. As such, the increase in data usage sessions can decrease the performance of core network devices which may analyze and handle data usage sessions, such as for routing, relaying, and other transport services. Moreover, the increase in the amount of data (e.g., hundreds of terabytes of information) may generate unnecessary data records that are not useful to the network, and therefore reduce resource performance associated with the network (e.g., any of network transport resources, core network devices, and/or a network session server). As such, embodiments of the present disclosure provide systems and operations that may improve network resource performance (e.g., any of network transport resources, core network devices, and/or a network session server) through creation of raw session records based on handling a simultaneous usage session that provides cotemporal data usage sessions between a user equipment and a network for routing to one or more web servers. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that provide computer-executable instructions to perform particular tasks or implement particular data types in response to execution on a processor. Moreover, those skilled in the art will appreciate that the subject matter described herein may be practiced with other computer system configurations, including handheld devices, multiprocessor systems, microprocessor-based or programmable consumer electronics, minicomputers, mainframe computers, and other particularized, non-generic machines.

Referring now to FIG. 1, aspects of an operating environment 100 for various embodiments of the concepts and technologies disclosed herein for providing mobile network handling of a simultaneous usage session will be described, according to an illustrative embodiment. The operating environment 100 shown in FIG. 1 includes a user equipment ("UE") 130 operating in communication with a communications network ("network") 102 via an access point 104. The operating environment 100 also includes one or more instances of web servers 103, network transport resources 106, a network resource controller 107, a core network device 110, a data lake 140, and a network session server 150. It should be understood that this embodiment is illustrative, and should not be construed as limiting the number of other embodiments in any way.

According to various embodiments, the functionality of the UE 130 may be provided by one or more server computers, desktop computers, mobile telephones, smartphones, tablet computers, laptop computers, smart watches, web browsers (e.g., browser-based implementations of communication devices), set-top boxes, over-the-top devices, vehicle computing systems, other computing systems, and the like. It should be understood that the functionality of the UE 130 can be provided by a single device, by two or more similar devices, and/or by two or more dissimilar devices. For purposes of describing the concepts and technologies disclosed herein, the UE 130 is described herein as a mobile communication device, such as a smartphone. Further discussion of an embodiment of the UE 130 is discussed below with respect to FIG. 7. In some embodiments, the UE 130 can be embodied by an instance of a computing system or a communication device, which are discussed below with respect to FIG. 6. It should be understood that this embodiment is illustrative, and should not be construed as being limiting in any way.

The UE 130 can include one or more instances of a processing unit, such as a processor 131, that can be configured to perform operations based upon execution of an operating system (not shown) and/or one or more application programs such as, for example, applications 134A-N. The UE 130 can include a memory 133 that stores the applications 134A-N and the operating system. It is understood that the operating system can be a computer program or other computer-executable instructions for controlling the operation of the UE 130. The UE 130 can correspond with one or more unique and/or shared identifier, such as a UE identifier 138. The UE identifier 138 can include, but should not be limited to, one or more of a device serial number, a device model number, a telephone number, a source network address (e.g., an IP address, MAC address, etc.), an electronic mail address, an international mobile equipment identity, an electronic serial number, a mobile equipment identifier, or any other identifier that can be assigned to or otherwise correspond with the UE 130 for identification operations. The UE 130 can include one or more communication components 132, such as but not limited to transceivers, modems, antenna, circuitry, and other virtual and/or non-virtual components that can facilitate, provide, and support wide area and/or local area communicative coupling. For example, in some embodiments, the UE 130 can activate the communication components 132 to engage in communicative coupling with the network 102 via the access point 104. In various embodiments, the applications 134A-N can access the communication components 132 via an application programming interface ("API"). In some embodiments, an instance of an API corresponding to a particular application may allow other applications within the UE 130 and/or outside of the UE 130 to directly access the application via the API. In some embodiments, an API which can be accessed directly by other applications on the UE 130 and/or by applications outside of the UE 130 (e.g., by an application or service on the network session server 150) may be referred to as an "open API." In some embodiments, an API corresponding to one or more of the applications 134A-N may have a "locked API," such as an instance of the locked API 135, which disallows direct access to the application, thereby preventing monitoring, analysis, and/or retrieval of information by other applications on the UE 130 and/or outside of the UE 130. In some embodiments, the locked API 135 prevents or otherwise does not provide direct access to a corresponding one of the applications 134A-N without access credentials (e.g., a key, token, password, etc.) and therefore may be considered inaccessible to devices and/or other applications or services which do not possess the access credentials, such as a simultaneous session analysis service ("SSAS") 154 discussed below with respect to the networks session server 150.

In various embodiments, the data and information that is transmitted and/or received between the UE 130 and the network 102 can be included within, and is represented by, a mobile data traffic stream 139. In some embodiments, the mobile data traffic stream 139 can include data that is packetized for routing to a target destination, such as one or more of web domains 105A-N that can be supported or otherwise hosted by the web servers 103. According to various embodiments, the applications 134A-N can be configured as an application, a program, a software module (i.e., a defined set of callable computing instructions that configure a processor to perform one more operations), a service, or any other computer executable and/or computer readable instructions that can configure the processor 131 to perform one or more operations. In some embodiments, one or more of the applications 134A-N can provide a web browser and/or a mobile application. The UE 130 can support the operation and execution of multiple instances of the applications 134A-N concurrently, where each of the applications 134A-N can correspond with one or more data usage session, such as one or more of the data usage sessions 136A-N. For example, in some embodiments, one or more of the applications 134A-N can be launched via input from a user 129. When one or more of the applications 134A-N executes on the UE 130, various data calls and requests can be generated to form a data usage session, such as one of the data usage sessions 136A-N. Each of the data usage sessions 136A-N can include information and data that can be provided to and/or from the network 102, such as represented in the mobile data traffic stream 139. In various embodiments, one and/or each of the data usage sessions 136A-N can be directed towards a target destination, such as one of the web domains 105A-N. In some embodiments, each of the data usage sessions 136A-N can include one or more instances of an initiated request and/or an unsolicited bot message, which will be further discussed below with respect to FIG. 2. When one or more of the applications 134A-N collectively generate or otherwise correspond with two or more of the data usage sessions 136A-N such that the two or more data usage sessions 136A-N occur cotemporally, then the UE 130 is engaging in a simultaneous usage session 137 due to the cotemporal occurrence of a plurality of data usage sessions 136A-N with the UE 130 and the network 102. Further discussion of an instance of the simultaneous usage session 137 will be discussed below. In various embodiments, data and information pertaining to one or more of the data usage sessions 136A-N and the simultaneous usage session 137 can be transmitted to the access point 104 via the mobile data traffic stream 139. It should be understood that the examples provided are for illustration purposes only, and therefore should not be construed as limiting in any way.

In various embodiments, the access point 104 can provide communicative coupling between one or more devices (e.g., the UE 130, the core network device 110, the network session server 150, and/or the web servers 103) and the network 102. The access point 104 can provide wired and/or wireless communicative coupling and can include, but should not be limited to, one or more of a base transceiver station, a wireless router, a femtocell, an eNode B, a NodeB, a gNodeB (i.e., an access point that incorporates New Radio access technology, such as LTE Advanced and other 5G technology), a multi-standard metro cell node, a customer premise edge node (e.g., an optical network terminal), and/or other network nodes or combinations thereof that are capable of providing communication to and/or from the network 102. It should be understood that the examples provided are for illustration purposes only, and therefore should not be construed as limiting in any way.

In various embodiments, the network 102 can include one or more of a radio access network, an evolved packet core network, a core network, an IP-based network, a transport network, an optical transport network, a circuit switched network, such as publicly switched telephone network ("PSTN"), a cellular network, a mobile Wide Area Network, a combination thereof, or the like. In some embodiments, at least a portion of the network 102 can be associated with and/or otherwise operated by a communication service provider that provides communication services within a core of the network 102 and/or an edge of the network 102. Further discussion of aspects that can be embodied within the network 102 are provided below with respect to FIG. 5. It should be understood that the examples provided are for illustration purposes only, and therefore should not be construed as limiting in any way.

In various embodiments, the network 102 can communicatively couple the UE 130 and/or other devices to the web servers 103. The web servers 103 refer to any virtualized and/or non-virtualized hardware computing system that can support, host, provide access to, and/or be associated with one or more of the web domains 105A-N. Each of the web domains 105A-N represents a source of information that is being targeted by one or more of the applications 134A-N of the UE 130. For example, the web domains 105A-N can be associated with or otherwise include a domain name that conforms to a Domain Name System that provides a domain name syntax. In some embodiments, the web domains 105A-N can be publicly available, such as via the Internet, or privately available, such as via an Intranet. In various embodiments, each of the data usage sessions 136A-N can include requests and/or messages that are configured in a format so as to identify one of the web domains 105A-N. For example, in some embodiments, the mobile data traffic stream 139 can include requests and/or messages that provide a Uniform Resource Locator and/or a Uniform Resource Identifier corresponding with one of the web domains 105A-N. In various embodiments, the network 102 can facilitate relaying and routing information pertaining to the simultaneous usage session 137 through the use of the network transport resources 106 and/or one or more instances of the core network device 110.

In various embodiments, the network transport resources 106 refer to any processing resource, memory resource, and/or other computing resource that can be implemented to support and/or provide network transport operations for the network 102 and/or one or more devices discussed herein, such as the core network device 110. In some embodiments, the network transport resources 106 can provide scalable virtual and/or non-virtual hardware computing resources and/or software resources so as to dynamically adapt to the varying processing and memory demands on the network 102 and/or the core network device 110. For example, the network transport resources 106 can provide a server farm or other distributed computing platform that can handle one or more instances of the simultaneous usage session 137 from one or more instances of the UE 130. In various embodiments, allocation of computing resources provided by the network transport resources 106 can be controlled by the network resource controller 107. The network resource controller 107 can include an application, software module, or any other computer readable and/or executable instructions that configure the network transport resources 106 to support various devices and/or services available via the network 102, such as but not limited to, supporting a data tonnage assessment service 108, the simultaneous session analysis service ("SSAS") 154, one or more instances of the core network device 110 and/or the network session server 150.

In various embodiments, the core network device 110 can be located within the network 102 so as to provide transport, relay, and/or routing services for the network 102 and/or a communications service provider. One or more instances of the core network device 110 can serve as an intermediary between the UE 130 and the web servers 103 such that the mobile data traffic stream 139 is relayed, routed, or otherwise through one or more instance of the core network device 110 before being forwarded on to the web servers 103. Instances of the core network device 110 can include, but should not be limited to, a multi-service proxy ("MSP") 116, a core router 118, a packet data network gateway ("PGW") 120, a session management function 122 that can operate as part of a 5G and/or New Generation core architecture of the network 102, and/or a user plane function 124 that can serve as architecture within a mobile packet core ("MPC") in 5G and/or Next Generation core architecture of the network 102. It is understood that an instance of the MSP 116 can handle traffic in the network 102 that is targeted for one of the web domains 105A-N, and may be configured to perform optimization functions to reduce the volume of data generated by various instances of the web domains 105A-N. The core router 118 can provide routing and relay services within a core of the network 102. It should be understood that the examples provided are for illustration purposes only, and therefore should not be construed as limiting in any way.

Figure 2:
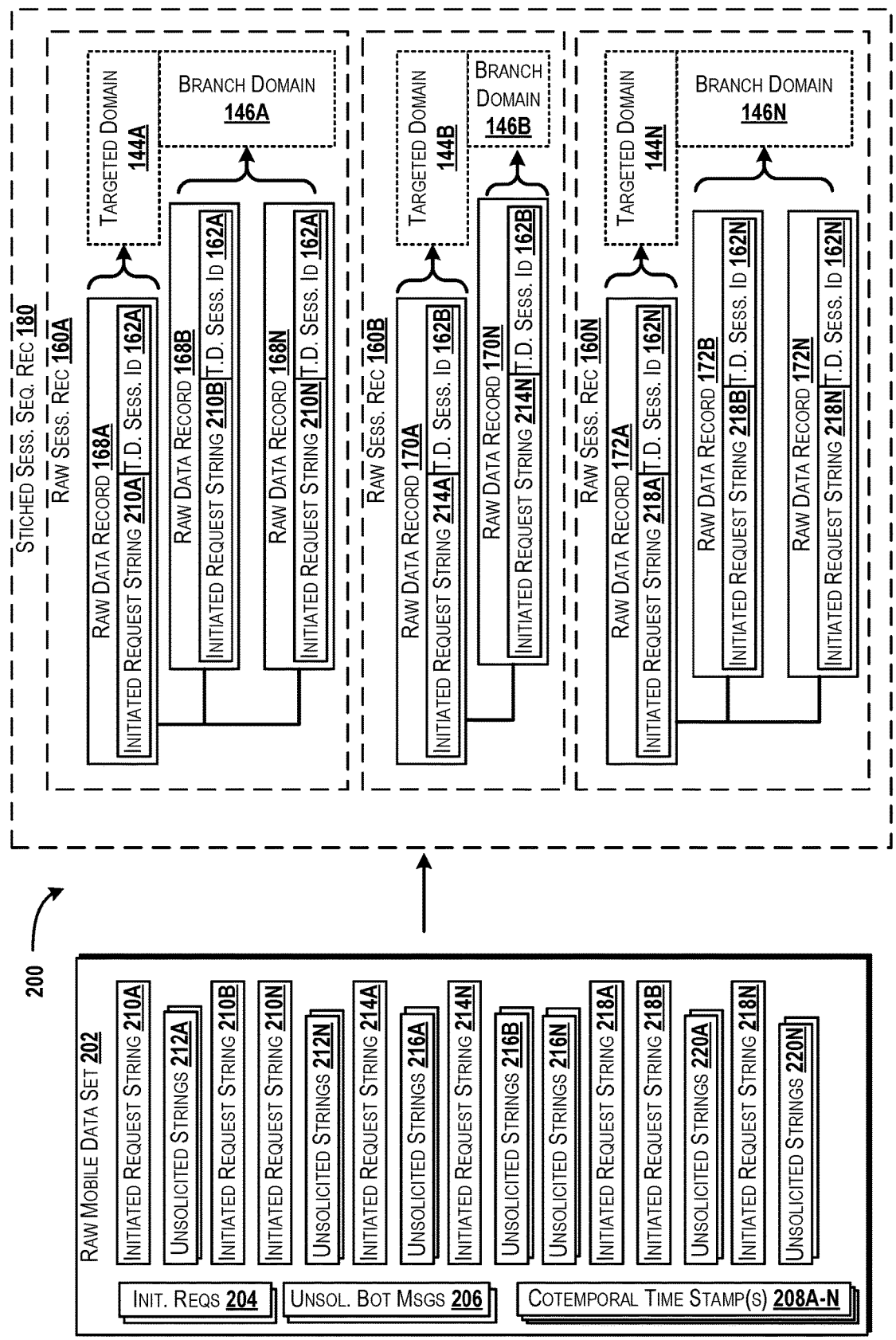
FIG. 2 is a block diagram showing an example of a raw mobile data set that is generated due to a simultaneous usage session and can be implemented in the illustrative operating environment shown in FIG. 1, according to an illustrative embodiment of the concepts and technologies described herein.

In some embodiments, the core network device 110 can include a network data store 114 that provides a memory storage device for use by one or more network services discussed herein, such as the data tonnage assessment service 108 and/or the SSAS 154. The network data store 114 can be an embodiment of, and be configured substantially similar to, an instance of memory 604 discussed below with respect to FIG. 6. In some embodiments, the user 129 subscribes to a network service that enables the UE 130 to communicatively couple to the network 102. In some embodiments, the network service may impose a limit and/or track the amount of data usage of the UE 130 on a periodic basis, such as, for example, an allowance of 10 gigabytes of data usage per month. The data tonnage assessment service 108 may instruct the core network device 110 to record a copy or duplicate of data packets of the mobile data traffic stream 139 passing through the core network device 110 during routing to the web servers 103. In some embodiments, the MSP 116 may perform this function. The information that is included in the mobile data traffic stream 139 can be incorporated into one or more instances of a raw mobile data set 202. The raw mobile data set 202 can be stored in the network data store 114 of the core network device 110. An embodiment of the raw mobile data set 202 is shown in FIG. 2 and further discussed below. In some embodiments, the data tonnage assessment service 108 can analyze the raw mobile data set 202 to assess the amount of data being used by the UE 130, such as measured in gigabytes, megabytes, or the like. The data tonnage assessment service 108 can be supported by one or more of the network transport resources 106. In some embodiments, the data tonnage assessment service 108 can be provided by a web application, a software as a service, and/or a standalone application. It should be understood that the examples provided are for illustration purposes only, and therefore should not be construed as limiting in any way.

In various embodiments, the operating environment 100 can include the network session server 150 that can execute, host, facilitate, or otherwise support the SSAS 154 via one or more instances of processing resources, such as a processor 151, and/or memory resources, such as a memory 153. In some embodiments, the memory 153 can provide the data lake 140, which is further discussed below. In some embodiments, the memory 153 can include volatile and/or non-volatile memory implemented in any method or technology for storage of information and/or other data disclosed herein. The memory 153 can be referred to as a "computer storage medium." It is understood that, in the claims, the use of the terms "memory" and "computer storage medium" and variations thereof, such as computer-readable storage medium, do not include, and shall not be construed to include, a wave or a signal per se and/or communication media. In some embodiments, the network session server 150 may be configured as a server computer system that supports a core architecture of the network 102 and may invoke virtual and/or non-virtual processing and computing resources. In some embodiments, the network session server 150 can be communicatively located between the UE 130 and the web servers 103, and therefore be an intermediary device of the network 102. The network session server 150 can be configured according to an embodiment of a computer system discussed with respect to FIG. 6.

It is understood that, as used herein, the use of the term "service" (e.g., regarding the data tonnage assessment service 108 and/or the SSAS 154) is intended to correspond with one or more operations that support the handling of data and information via the network 102, such as one or more operations pertaining to the simultaneous usage session 137. Therefore, any use of the term "service" in the claims shall not be construed or interpreted as being direct to, involving, or otherwise including non-patentable subject matter or a judicial exception (e.g., an abstract idea, etc.). In various embodiments, the SSAS 154 and/or the data tonnage assessment service 108 can be included one or more of an application, a software module (i.e., a defined set of callable computing instructions that configure a processor to perform one more operations), a script, a routine or any other computer-executable instructions that configure a processor (e.g., the processor 151) and/or computing resources (e.g., the network transport resources 106) to perform one or more operations and/or recitations discussed herein. Additionally, it is understood that use of the term "N" refers to an arbitrary number of instances that may vary depending on how many instances of that component are in existence. Use of the term "N" is provided for clarity and illustration purposes only. As such, although a certain number of instances may be illustrated, it is understood that specific number of instances shown is for illustration purposes only and therefore should not be construed as limiting in any way. It should be understood that the examples provided are for illustration purposes only, and therefore should not be construed as limiting in any way.

In various embodiments, the network session server 150 can be communicatively coupled to one or more of the devices discussed with respect to the operating environment 100 via one or more instances of a communication interface 152. Instances of the communication interface 152 can be supported by one or more communication components, such as transceivers, antennas, ports, network interface cards, or any other communication component, such as an embodiment of a network device 610 discussed below with respect to FIG. 6. As shown in FIG. 1, the network session server 150 can be communicatively coupled, directly and/or indirectly, with other devices within the operating environment 100, such as but not limited to the core network device 110, the network 102, the access point 104, the web servers 103, the UE 130, the data lake 140, the data tonnage assessment service 108, the network transport resources 106, the network resource controller 107, or any other computing system. In embodiments, the network session server 150 can include a non-generic computer system that can be configured by the execution of the SSAS 154, and/or other computer instructions can cause performance of one or more operations discussed herein. The memory 153 can store at least a portion of the computer readable and/or executable instruction for the SSAS 154 and/or other information, such as a simultaneous session analysis tool 155, a client access portal 156, a session state machine 157, one or more instances of raw session records 160A-N, a stitched session sequence record 180, a rejected session record 184, a domain reconfiguration message 188, and/or a resource reconfiguration command 190. It should be understood that the examples provided are for illustration purposes only, and therefore should not be construed as limiting in any way.

In various embodiments, the SSAS 154 facilitates the building of raw session records, such as the raw session records 160A-N, for handling the cotemporal data usage sessions that provide the simultaneous usage session 137, such as the data usage sessions 136A-N. In various embodiments, when one or more of the applications 134A-N on the UE 130 transmit and/or receive information via the mobile data traffic stream 139, a plurality of data usage sessions 136A-N may occur cotemporally. For example, if the user 129 interacts with the UE 130 to launch one or more of the applications 134A-N to visit a first web domain and a second web domain (e.g., the web domains 105A and 105B, respectively), that causes at least two data usage sessions to occur simultaneously, such as the data usage sessions 136A and 136B, respectively. In an embodiment, the first web domain and the second web domain may be associated with competing corporations that provide e-commerce or other network services. The user 129 may provide inputs on the UE 130 to transition back and forth between the applications 134A-N and/or the data usage sessions 136A and 136B. As such, when the user 129 views and/or provides input to the applications 134A-N visiting the first and second web domains, a torrent of initiated requests may occur cotemporally because the applications supporting the data usage sessions 136A and 136B are operating simultaneously on the UE 130. In various embodiments, the core network device 110 may intercept the mobile data traffic stream 139 on its way to the web servers 103. In some embodiments, the MSP 116 can be an instance of the core network device 110 that captures data from the mobile data traffic stream 139 and creates the raw mobile data set 202 which can be used for analysis by the data tonnage assessment service 108. The data tonnage assessment service 108 can analyze the raw mobile data set 202 to determine the amount of total data usage that occurred during a specific time period. However, the data tonnage assessment service 108 may not necessarily analyze or distinguish the type, source, and/or target of requests and messages included within the raw mobile data set 202. It should be understood that the examples provided are for illustration purposes only, and therefore should not be construed as limiting in any way.

In some embodiments, the SSAS 154 may generate a session probe 112 that can be instantiated on an instance of the core network device 110, such as the MSP 116. The session probe 112 can be configured to observe and make the raw mobile data set 202 available to the SSAS 154. The session probe 112 can be a software module, routine, application, or other computer instruction that executes on the core network device 110 to obtain the raw mobile data set 202 for the SSAS 154. In an embodiment, the session probe 112 may have root level access to the core network device 110 such that the session probe 112 can observe and obtain the raw mobile data set 202 without interfering or otherwise impeding with the operations of the core network device 110. The session probe 112 can utilize the raw mobile data set 202 that would typically be designated for use by the data tonnage assessment service 108, and reconfigure information extracted from the raw mobile data set 202 so as to create raw session records, such as the raw session records 160A-N discussed below.

For clarity purposes, a discussion of a block diagram 200 shown in FIG. 2 will accompany the discussion with respect to the operating environment 100 of FIG. 1. As shown in FIG. 2, with continued reference to FIG. 1, the raw mobile data set 202 can include one or more instances of initiated requests 204, one or more instances of unsolicited bot messages 206, and cotemporal time stamps 208A-N. The raw mobile data set 202 may have data that is intermingled, and therefore may not clearly indicate which instance of data pertains to each other. Each of the initiated requests 204 can correspond and/or be associated with one of the web domains 105A-N. The initiated requests 204 can include one or more initiated request strings, such as any of the initiated request strings 210A-N, 214A-N, and 218A-N. In some instances, the initiated request strings 210A-N, 214A-N, and 218A-N may have been extracted from the initiated requests 204, and therefore may be included within the raw mobile data set 202 without the initiated requests 204. Each of the initiated request strings 210A-N, 214A-N, and 218A-N can be configured in a syntax that conforms to the web domain 105A-N being targeted, such as in the format of a URI and/or a URL. Each of the initiated request strings 210A-N, 214A-N, and 218A-N can be generated in response to input, from the user 129, to one or more of the applications 134A-N and a corresponding one or more of the data usage sessions 136A-N. For example, if the user 129 instructs the application 134A to visit the web domain 105A via the data usage session 136A, and once at the web domain 105A, the user instructs the application 134A to visit two other web domains (e.g., web domains 105B and 105C) by clicking on links provided by the web domain 105A, then the raw mobile data set 202 would include initiated request strings corresponding to the web domains 105B and 105C. As such, each of the initiated request strings 210A-N, 214A-N, and 218A-N is based on input provided during one of the data usage sessions 136A-N. In some embodiments, when visiting and/or requesting information corresponding to any of the web domains 105A-N, one or more unsolicited bot messages may be provided within the mobile data traffic stream 139, such as due to bots within a webpage of the particular web domain that provide unsolicited media content during one of the data usage sessions 136A-N. As such, the unsolicited bot messages 206 can include and/or indicate one or more unsolicited request strings ("unsolicited strings"), such as the unsolicited strings 212A-N, 216A-N, and 220A-N so that the unsolicited media content is provided during the data usage sessions 136A-N. In some embodiments, two or more of the initiated request strings 210A-N, 214A-N, and 218A-N, and/or unsolicited strings 212A-N, 216A-N, and 220A-N may be requested and/or provided cotemporally, which in turn can provide multiple instances of the cotemporal time stamps 208A-N. In some embodiments, the initiated request strings 210A-N, 214A-N, 218A-N and/or unsolicited strings 212A-N, 216A-N, 220A-N may be without an indication as to which data usage session the particular string pertains, such as without an indication within the URL or URI of a first initiated request string indicating which of the web domains 105A-N triggered the launch and request of the other initiated request string or one or more unsolicited strings.

In some embodiments, the data usage sessions 136A-N may occur concurrently, and therefore the corresponding time stamps indicated within the raw mobile data set 202 may be cotemporal, such as indicated by the cotemporal time stamps 208A-N. In some embodiments, the raw mobile data set 202 may indicate (via the initiated request strings 214A-N, 218A-N and/or the unsolicited strings 212A-N, 216A-N, 220A-N) one or more of the web domains 105A-N that were visited without a clear indication as to the sequence of inputs on the UE 130 that indicates the chronology of interaction between various data usage sessions 136A-N that make up the simultaneous usage session 137. As such, when the user 129 is switching back and forth between two or more data usage sessions 136A-N and providing input that launches multiple instances of initiated request strings and the unsolicited strings, the order and sequence in which the various data usage sessions were engaged may not be apparent. The communication service provider, or other entity, may seek to determine if network and computing resources are being efficiently allocated in handling the simultaneous usage session 137, and therefore may desire to determine the sequence and/or chronology of interactions during the simultaneous usage session by creating raw session records that collate the sequence of initiated request strings to indicate which interactions and requests for a particular one of the web domains 105A-N are related to each other without impeding routing of the mobile data traffic stream 139 to the web servers 103. As such, the operations discussed herein can improve the allocation of the network transport resources 106 through analysis of the simultaneous usage session 137.

In various embodiments, the SSAS 154 can obtain, from the session probe 112, the raw mobile data set 202. The SSAS 154 can determine and/or confirm that the raw mobile data set 202 is associated with the UE 130, such as based on the raw mobile data set 202 indicating the UE identifier 138. In some embodiments, the plurality of initiated request strings 210A-N, 214A-N, and 218A-N may be intermingled with the plurality of unsolicited strings 212A-N, 216A-N, 220A-N within the raw mobile data set 202. The SSAS 154 can analyze the raw mobile data set 202 so as to identify and use the initiated request strings 210A-N, 214A-N, and 218A-N, while discarding or omitting the unsolicited strings 212A-N, 216A-N, 220A-N. The SSAS 154 can determine that at least two of the initiated request strings 210A-N, 214A-N, and 218A-N are directed at different instances of the web domains 105A-N and that their corresponding time stamps occur cotemporally (i.e., they have instances of one of the cotemporal time stamps 208A-N). By this, the SSAS 154 can determine that at least some of the initiated request strings 210A-N, 214A-N, and 218A-N correspond with different data usage sessions that occur cotemporally on the UE 130. Because the raw mobile data set 202 includes initiated request strings from multiple data usage sessions that occur cotemporally, the SSAS 154 can determine that the UE 130 is engaging in, or has engaged in, the simultaneous usage session 137. It should be understood that the examples provided are for illustration purposes only, and therefore should not be construed as limiting in any way.

In some embodiments, in response to determining that the UE 130 is engaging in the simultaneous usage session 137, the SSAS 154 may attempt to directly access one or more of the applications 134A-N to obtain a sequence of the interactions from the data usage sessions 136A-N that provide the simultaneous usage session 137. In some embodiments, the SSAS 154 may be able to determine which of the applications 134A-N provided the initiated request strings 210A-N, 214A-N, and 218A-N based on information included in the raw mobile data set 202. In some embodiments, the SSAS 154 may access the data lake 140 that stores a locked API application map 143. The locked API application map 143 can provide a mapping as to which of the applications 134A-N have a locked API, such as by corresponding with an instance of the locked API 135. The SSAS 154 may determine, based on the locked API application map 143, that one or more of the applications 134A-N cannot be directly accessed based on one or more instance of the locked API 135 on the UE 130. As such, the SSAS 154 may not rely on the UE 130 to provide the chronology or sequence of input that provided the initiated request strings 210A-N, 214A-N, and 218A-N within the simultaneous usage session 137. It should be understood that the examples provided are for illustration purposes only, and therefore should not be construed as limiting in any way.

In various embodiments, the data lake 140 can provide a memory for data storage that can be accessible to the SSAS 154. The data lake 140 refers to a data storage device such as a database, a data server, a mass data storage device, or other memory or computer readable medium. In some embodiments, the network data store 114 and/or the memory 153 can provide the data lake 140. In some embodiments, the data lake 140 can include a raw domain mapping 142. The raw domain mapping 142 can include and indicate one or more targeted domains, such as targeted domains 144A-N. Each of the targeted domains 144A-N corresponds with one of the web domains 105A-N. The SSAS 154 may configure the raw domain mapping 142 to indicate which of the web domains 105A-N are of interest to the communication service provider, and in turn, populate the raw domain mapping 142 with entries that are designated as one of the targeted domains 144A-N which correspond with and point to one of the web domains 105A-N. When a link or pointer within data or content provided by one of the web domains 105A-N causes an instance of an initiated request string (e.g., any of the 210A-N, 214A-N, and 218A-N) to be generated and redirects one of the data usage sessions 136A-N to another one of the web domains 105A-N (or launches another data usage session corresponding to the simultaneous usage session 137), then the other web domain is designated as a branch domain of a corresponding targeted domain, such as a branch domain 146A of the targeted domain 144A. Put simply, if a first web domain has a link that redirects a current data usage session to a second web domain, or launches another cotemporal data usage session directed towards the second web domain, then the first web domain would be the targeted domain and the second web domain would be a branch domain of the targeted domain. In some embodiments, a plurality of branch domains can exist for a targeted domain. In some embodiments, an instance of one of the web domains 105A-N may be reflected in both a branch domain and a targeted domain. For example, a second web domain may be designated as a branch domain for a first web domain, and the second web domain may have a separate entry within the raw domain mapping 142 where the second web domain is indicated as a targeted domain, and a third web domain is a branch domain of the targeted domain that corresponds with the second web domain. Therefore, the raw domain mapping 142 can be used to determine whether a web domain corresponding to an initiated request string is a targeted domain and/or a branch domain.

In various embodiments, the SSAS 154 can identify which of the target domains 144A-N are present within the raw mobile data set 202. The SSAS 154 can analyze the URI and/or URL of each of the initiated request strings 210A-N, 214A-N, and 218A-N to determine whether they correspond with one of the targeted domains 144A-N. For example, the SSAS 154 can determine that the initiated request strings 210A, 214A, and 218A occur cotemporally (e.g., because of the initiated request strings 210A, 214A, and 218A being created contemporaneously), and each corresponds with one of the targeted domains, such as the targeted domains 144A, 144B, and 144N, respectively. In some embodiments, the SSAS 154 can determine that the initiated request strings 210B and 210N occur cotemporally with each other, but occur after the initiated request string 210A. The SSAS 154 can determine that the initiated request strings 210B and 210N correspond with the web domains 105B and 105N, and based on the raw domain mapping 142, the web domains 105B and 105N may be designated as instances of the branch domains 146A of the targeted domain 144A (which, in an embodiment, corresponds with the initiated request string 210A). In some embodiments, the initiated request strings 210B and 210N may be referred to as first branch domains corresponding with a first targeted domain, such as the targeted domain 144A, according to an example. Similarly, the initiated request string 214A may be determined to correspond with the targeted domain 144B based on the raw domain mapping 142. The SSAS 154 may determine that the initiated request string 214N occurs after the initiated request string 214A, and the initiated request string 214N corresponds with a branch domain 146B for the targeted domain 144B. As such, in some embodiments, the initiated request string 214N may be designated as a second branch domain for a second targeted domain (which, in an embodiment, corresponds with the targeted domain 144B). In some embodiments, the SSAS 154 may further determine that the initiated request strings 218B and 218N correspond with a branch domain 146N, which is a branch domain of the targeted domain 144N, then the SSAS 154 may determine that the initiated request strings 218B and 218N are associated with the initiated request string 218A (which, in an embodiment, corresponds with the targeted domain 144N).

In response to the SSAS 154 determining which of the initiated request strings are associated with a targeted domain or branch domain, the SSAS 154 can create a targeted domain session identifier for each data usage session and initiated request string corresponding to a targeted domain or branch domain for the data usage session. For example, since the initiated request strings 210B and 210N are associated with the branch domain 146A, which is a branch domain for the targeted domain 144A, then the SSAS 154 can create a targeted domain session identifier 162A to link the initiated request string 210A for the targeted domain 144A with the initiated request strings 210B and 210N that are associated with the corresponding branch domain 146A. Stated differently, the initiated request strings 210A-N which correspond with one of the targeted domain 144A or the branch domain 146A will each be associated with the same targeted domain session identifier 162A so as to indicate a common data usage session, such as the data usage session 136A. Similarly, a targeted domain session identifier 162B can indicate the targeted domain 144B and be used for the initiated request string 214A that corresponds with the targeted domain 144B and the initiated request string 214N that corresponds with the branch domain 146B. By this, the targeted domain session identifier 162B can link or otherwise associate the initiated request strings 214A and 214N with a shared data usage session, such as the data usage session 136B. As another example, the SSAS 154 can create a targeted domain session identifier 162N because the initiated request string 218A corresponds with the targeted domain 144N and the initiated request strings 218B and 218N were generated subsequent to the initiated request string 218A and based on content and data provided by the initiated request string 218A. As such, the targeted domain session identifier 162N can link or otherwise associate the initiated request strings 218A-N with a data usage session, such as the data usage session 136N.

In various embodiments, the SSAS 154 can generate a raw session record for each of the targeted domains associated with the simultaneous usage session 137, such as the raw session records 160A-N for the data usage sessions 136A-N pertaining to the targeted domains 144A-N, respectively. Instances of the raw session records 160A-N can include a targeted domain session identifier (e.g., any of the targeted domain session identifiers 162A-N), a raw session timeout period (e.g., any of raw session timeout periods 164A-N), session boundary data (e.g., any of session boundary data 166A-N), and raw data records indicating a targeted domain for a corresponding data usage session (e.g., any of raw data records 168A-N, 170A-N, 172A-N). As indicated above, each of the targeted domain session identifiers can correspond to one of the data usage sessions 136A-N that collectively provide the simultaneous usage session 137 and each targeted domain session identifier indicates the particular targeted domain that is the target and/or genesis of a particular initiated request string. For example, as shown in FIG. 2, the same targeted domain session identifier 162A can be generated for each of the initiated request strings 210A, 210B, and 210N. Although the initiated request strings 210B and 210N are directed to the branch domain 146A, the targeted domain session identifier 162A is still applied to the initiated request strings 210B and 210N because the branch domain 146A stems from (or is otherwise associated with) the targeted domain 144A (e.g., due to the targeted domain 144A having a link that points to the branch domain 146A such that when the link is followed—such as through user input—then one of the initiated request strings 210B and/or 210N is generated and directs the data usage session 136A to the branch domain 146A, which corresponds with one of the web domains 105A-N). Each of the targeted domain session identifiers 162A-N may be a unique identifier that indicates both the corresponding targeted domain and an indicator for the corresponding data usage session from which the initiated request strings pertain.

For example, if the user 129 engages in a first data usage session one day to visit a first web domain, and then a week later engages in a second data usage session to visit the same first web domain, the SSAS 154 may generate a different targeted session identifier for each of the first data usage session and the second data usage session, despite the targeted domain being the same each time (due to the targeted domain corresponding to the first web domain each time). By this, each of the targeted domain session identifiers 162A-N can provide clarity as to which of the initiated request strings should be associated with each other, along with indication as to which data usage session is at issue. As such, the targeted domain session identifier 162B can be used for the initiated request strings 214A and 214N which are part of the same data usage session (e.g., the data usage session 136B), where the initiated request string 214A is directed to the targeted domain 144B and the initiated request string 214N is directed to the branch domain 146B (where the initiated request string 214N was generated based on input from the user 129 while at the targeted domain 144B). As another example, the targeted domain session identifier 162N can be used for each of the initiated request strings 218A-N because the initiated request string 218A is directed towards the targeted domain 144N and the initiated request strings 218B and 218N were generated due to links within the targeted domain 144N that caused the data usage session 136N to be directed to the branch domain 146N.

In various embodiments, the SSAS 154 can generate raw data records that can be included in a raw session record. For example, each of the initiated request strings 210A-N, 214A-N, and 218A-N can be transformed into separate instances of a raw data record. The SSAS 154 can append the targeted domain session identifier 162A (which in some embodiments may be referred to as a first targeted domain session identifier) to the initiated request string 210A that corresponds with the targeted domain 144A and append the targeted domain session identifier 162A to each of the initiated request strings 210B and 210N that correspond with the branch domain 146A (which in some embodiments may be referred to as a first branch domain). By appending the targeted domain session identifier 162A as discussed above, the SSAS 154 can generate each of the raw data records 168A-N for the raw session record 160A, where the raw session record 160A corresponds to the targeted domain 144A and the data usage session 136A. The raw data records 168A-N can be included in the raw session record 160A.

In various embodiments, the SSAS 154 can append the targeted domain session identifier 162B (which in some embodiments may be referred to as a second targeted domain session identifier) to the initiated request string 214A that corresponds with the targeted domain 144B and append the targeted domain session identifier 162B to the initiated request string 214N that corresponds with the branch domain 146B (which in some embodiments may be referred to as a second branch domain). By appending the targeted domain session identifier 162B as discussed above, the SSAS 154 can generate each of the raw data records 170A-N for the raw session record 160B, where the raw session record 160B can correspond to the targeted domain 144B and the data usage session 136B. The raw data records 170A-N can be included in the raw session record 160B.

Additionally, the SSAS 154 can append the targeted domain session identifier 162N (which in some embodiments may be referred to as a third targeted domain session identifier) to the initiated request string 218A that corresponds with the targeted domain 144N and append the targeted domain session identifier 162N to each of the initiated request strings 218B and 218N that correspond with the branch domain 146N (which in some embodiments may be referred to as a third branch domain). By appending the targeted domain session identifier 162N as discussed above, the SSAS 154 can generate each of the raw data records 172A-N for the raw session record 160N, where the raw session record 160N corresponds to the targeted domain 144N and the data usage session 136N. The raw data records 172A-N can be included in the raw session record 160N.

In some embodiments, the SSAS 154 may consult with the session state machine 157 to determine whether an instance of a raw data record should be created for a particular unsolicited string within the raw mobile data set 202. Specifically, in some embodiments, the SSAS 154 and/or the session state machine 157 can access the raw domain mapping 142 of the data lake 140 to determine whether the particular unsolicited string corresponds with one of the domains of the raw domain mapping 142 (e.g., any of the targeted domains 144A-N or branch domains 146A-N). In some embodiments, the SSAS 154 and/or the session state machine 157 can determine that one or more of the unsolicited strings 212A-N, 216A-N, and/or 220A-N does not correspond with any of the targeted domains 144A-N or branch domains 146A-N of the raw domain mapping 142, and therefore an instance of a raw data record is not generated for the unsolicited strings 212A-N, 216A-N, and/or 220A-N. In turn, the unsolicited strings 212A-N, 216A-N, and/or 220A-N are omitted from the raw session records 160A-N.

Through the generation of the raw data records 168A-N, 170A-N, 172A-N, the SSAS 154 can provide a mechanism for determining which of the initiated request strings belong to the same data usage session without directly accessing the UE 130. This can also improve the performance of the network session server 150 by omitting the unsolicited strings 212A-N, 216A-N, and 220A-N from being processed because the user 129 did not initiate those strings, but rather the unsolicited strings 212A-N, 216A-N, and 220A-N corresponded with the unsolicited bot messages 206 from one or more of the web domains 105A-N (which in turn correspond with one or more of the targeted domains or branch domains). As such, the raw data records can increase processor availability by enabling the client access portal 156 and the simultaneous session analysis tool 155 to point to the raw data records 168A-N, 170A-N, 172A-N (and/or the corresponding raw session records 160A-N) instead of the raw mobile data set 202, and in turn can increase the availability of the memory 153 through decreased file size. Moreover, the SSAS 154 can use the raw data records 168A-N, 170A-N, 172A-N to handle analysis of the simultaneous usage session 137 while allowing the web servers 103 to remain stateless (i.e., remain conformed to a REST architecture).

In various embodiments, the SSAS 154 can create and record a parameter within each of the raw session records 160A-N to indicate a raw session timeout period, such as the raw session timeout periods 164A-N that correspond with the raw session records 160A-N, respectively. In some embodiments, each of the raw session timeout periods 164A-N may be the same and/or different. Each of the raw session timeout periods 164A-N indicate a time period in which the SSAS 154 may continue to generate an instance of a raw data record for inclusion within a corresponding raw session record. For example, the raw mobile data set 202 may be updated and/or added to as time passes and the mobile data traffic stream 139 sends information about the data usage sessions 136A-N that make up the simultaneous usage session 137. In some embodiments, the session state machine 157 and/or the SSAS 154 may be checking how long it has been since the raw mobile data set 202 indicates that the UE 130 visited one of the targeted domains 144A-N during one of the data usage sessions 136A-N.

By way of example, the SSAS 154 and/or the session state machine 157 may determine that the data usage session 136A indicates that the UE 130 is visiting the targeted domain 144A (which may be associated with the web domain 105A) that can be, for example, a first home improvement store website. One or more initiated request strings 210A-N, 214A-N, and/or 218A-N may continue to be generated within the raw mobile data set 202 which pertain to the targeted domain 144A during the raw session timeout period 164A, and therefore the SSAS 154 may continue to generate raw data records 168A-N, 170A-N, and/or 172A-N using the targeted domain session identifier 162A and add that raw data record 168A-N, 170A-N, and/or 172A-N to the raw session record 160A. Before the raw session timeout period 164A ends (i.e., times out), the user 129 may switch to the data usage session 136B which corresponds with the UE 130 visiting the targeted domain 144B (which may be associated with the web domain 105B) that can be, for example, a second home improvement store website. Various unsolicited bot messages 206 may be generated during the simultaneous usage session 137 because both of the data usage sessions 136A and 136B are occurring cotemporally, however, the SSAS 154 omits the unsolicited bot messages 206 and corresponding unsolicited strings 212A-N, 216A-N, and/or 220A-N from inclusion within any of the raw session records. The SSAS 154 may determine that one or more initiated request strings 210A-N, 214A-N, and/or 218A-N continue to be generated within the raw mobile data set 202 pertaining to the targeted domain 144B, and therefore may generate one or more of the raw data records 170A-N using the targeted domain session identifier 162B, where the raw data records 170A-N can be included within the raw session record 160B. The user 129 can provide input to generate a new data usage session and/or switch back and forth between already existing data usage sessions of the simultaneous usage session 137. Each time the user 129 switches between various data usage sessions of the simultaneous usage session 137, additional instances of initiated request strings 210A-N, 214A-N, and/or 218A-N will be sent via the mobile data traffic stream 139, routed to the core network device 110 (e.g., the MSP 116), and added by the core network device 110 to the raw mobile data set 202, and therefore the SSAS 154 can use the additional instances of initiated request strings to generate additional raw data records for the corresponding domain. In an embodiment, the SSAS 154 and/or the session state machine 157 may determine that the raw session record 160B has timed-out (i.e., the raw session time period 164B corresponding to the targeted domain 144B and the raw session record 160B has ended) due to the user 129 no longer interacting (i.e., providing input) with the data usage session 136B, which in turn caused a lack of initiated request strings 210A-N, 214A-N, and/or 218A-N corresponding to the targeted domain 144B (and/or branch domain 146B) to be generated.

In various embodiments, when a raw session timeout period ends for a corresponding raw session record, the SSAS 154 can finalize the raw session record. In some embodiments, finalizing one of the raw session records 160A-N can include the SSAS 154 creating an instance of one of the session boundary data 166A-N. An instance of session boundary data, such as any of the session boundary data 166A-N, can indicate a start time and an end time corresponding to when a particular one of the data usage sessions 136A-N joined the simultaneous usage session 137 (i.e., started) and when it stopped belonging to the simultaneous usage session 137 (i.e., ended). Once the raw session timeout period ends for a corresponding raw session record, the SSAS 154 may no longer generate raw data records for inclusion within a raw session record for a targeted domain and data usage session. In some embodiments, instances of the session boundary data (e.g., any of the session boundary data 166A-N) may include the total number of "clicks" (i.e., distinct interactions or inputs that were provided during a data usage session) directed towards a targeted domain and/or a branch domain indicated by the raw session record. This can enable the SSAS 154 to distinguish between interactions on the UE 130 that were generated during the simultaneous usage session 137 due to input from the user 129 versus being created by a bot that initiated the unsolicited bot messages 206.

In some embodiments, the SSAS 154 and/or the session state machine 157 may identify initiated request strings within the raw mobile data set 202 that do not correspond with or are otherwise are not directed to any of the targeted domains 144A-N or branch domains 146A-N found in the raw domain mapping 142. Such initiated request strings may be referred to as a rejected request string. In some embodiments, the SSAS 154 can create a rejected session record identifier 186 and create a rejected session record, such as the rejected session record 184, by appending the rejected session record identifier 186 to the rejected request string. In some embodiments, the rejected session record 184 can include a cotemporal time stamp 185, which may be one of the cotemporal time stamps 208A-N. In some embodiments, the SSAS 154 can generate a domain reconfiguration message, such as the domain reconfiguration message 188, that can include the rejected session record 184. The SSAS 154 can provide the domain reconfiguration message 188 to the data lake 140 such that the raw domain mapping 142 is reconfigured to include the instance of the web domain (e.g., any of the web domains 105A-N) that was the target of the rejected request string and not previously found in the raw domain mapping 142. It should be understood that the examples provided are for illustration purposes only, and therefore should not be construed as limiting in any way.

In some embodiments, the SSAS 154 may create a stitched session sequence record, such as the stitched session sequence record 180, that can include a stitched session sequence map 182. The stitched session sequence record 180 can include the plurality of raw session records 160A-N, and all of the corresponding information therein. The stitched session sequence record 180 can use the raw session records 160A-N such that the raw session records 160A-N are processed and ordered, thereby creating the stitched session sequence map 182. The stitched session sequence record 180 may include an instance of the UE identifier 138 as to provide an association with the UE 130. The stitched session sequence map 182 can provide a chronology of interactions that occur on the applications 134A-N of the UE 130 based on the raw session records 160A-N despite the UE 130 engaging in the simultaneous usage session 137 that generated the initiated request strings (e.g., the initiated request strings 210A-N, 214A-N, and 218A-N) with cotemporal time stamps 208A-N. Specifically, the stitched session sequence map 182 can indicate that the raw session records 160A-N occurred cotemporally from the network perspective, while also indicating a chronologically ordered sequence that indicates which of the initiated request strings 210A-N, 214A-N, and 218A-N correspond with and/or are dependent (or otherwise stem from) each other. For example, the raw session record 160A indicates that the raw session records 160B and 160N occurred cotemporally on the UE 130, while also demonstrating that the raw data records 168B and 168N were generated based on user input for the initiated request string 210A, which is the raw data record 168A for the targeted domain 144A. In some embodiments, the stitched session sequence map 182 can indicate which of the raw data records across different raw session records are cotemporal with each other. For example, in an embodiment, the raw session records 160A-N may be designated as corresponding with the simultaneous usage session 137 because two or more raw data records included across the raw session records 160A-N may exist simultaneously or cotemporally with each other. For example, the stitched session sequence map 182 can indicate the following: that the raw data records 168A, 170A, and 172A (from the raw session records 160A-N, respectively) occurred cotemporally with each other; that the raw data records 168B, 168N, and 170N (from the raw session records 160A, 160N, and 160N, respectively) occurred cotemporally with each other, but subsequent to the raw data records 168A and 170A, thereby indicating that the user switched between the data usage sessions 136A and 136B (corresponding to the raw session records 160A and 160B, respectively) and launched the initiated request strings 210B, 210N, and 214N (corresponding to the raw data records 168B, 168N, and 170N, respectively) to visit the branch domains 146A and 146B after visiting (i.e., based on) the targeted domains 144A and 144B (as shown by the raw data records 168A and 170A, respectively). Similarly, the stitched session sequence map 182 may indicate that the raw data records 172B and 172N (from the raw session record 160N) occurred cotemporally with each other, but after the raw data record 172A, thereby indicating that the branch domain 146N was visited after the targeted domain 144N. Therefore, despite the raw mobile data set 202 having multiple cotemporal time stamps 208A-N for one or more of the initiated request strings 210A-N, 214A-N, and 218A-N, the stitched session sequence map 182 and the stitched session sequence record 180 can create a temporal sequence that indicates the manner in which interactions (i.e., inputs by the user 129 for one or more of the targeted domains 144A-N and/or branch domains 146A-N) occurred across the data usage sessions 136A-N on the UE 130 during the simultaneous usage session 137. The stitched session sequence map 182 can provide a network administrator with a set of raw session records that are tagged with the appropriate targeted domain session identifiers and indicate the sequence or chronology of the interactions on the UE 130, thereby permitting recovery of raw data records and stitching them into a proper, chronologically ordered sequence or journey without having to search through multiple unsolicited bot messages 206. It should be understood that the examples provided are for illustration purposes only, and therefore should not be construed as limiting in any way.

In some embodiments, the SSAS 154 may create a resource reconfiguration command, such as the resource reconfiguration command 190, that can be provided to the network resource controller 107 that controls allocation and/or reconfiguration of the network transport resources 106. In some embodiments, the SSAS 154 may determine, based on one or more of the raw session records 160A-N and/or the stitched session sequence record 180, that the amount of data within the raw mobile data set 202 (e.g., any of the initiated requests 204, the unsolicited bot messages 206, etc.) corresponding with the simultaneous usage session 137 (which may occur across one or more instances of the UE 130) exceeds a threshold (e.g., above and/or below average amount of initiated request strings and/or unsolicited strings, or other predefined number). In some embodiments, the SSAS 154 may determine that more and/or less of the network transport resources 106 should be allocated for use in handling the raw mobile data set 202 based on the analysis of the raw mobile data set 202 that served as a basis to generate one or more of the raw session records 160A-N. In some embodiments, the SSAS 154 can provide the resource reconfiguration command 190 to the network resource controller 107 so as to reconfigure the network transport resources 106 to provide more and/or less computing resources to the core network device 110, the network session server 150, and/or other device of the operating environment 100. It should be understood that this example is illustrative and therefore should not be construed as being limiting in any way.

In various embodiments, administrators or other users associated with communication service provider for the network 102 may access the SSAS 154 via the client access portal 156, where various information pertaining to mobile analytics can be determined and incorporated into other aspects of the network 102. In some embodiments, the client access portal 156 can implement the simultaneous session analysis tool 155, which may be a user interface tool that allows a user to interact with tens, hundreds, thousands, or even millions of data points across multiple instances of the raw mobile data set 202 so as to request generation of one or more of the raw session records 160A-N and/or stitched session sequence record 180 for any UE associated with the network 102. As such, the SSAS 154 can enable the analysis of millions of instances of simultaneous usage sessions across the network 102 in a manner that conserves network transport resources 106 and may allow for various web servers to remain stateless. It should be understood that this example is illustrative and therefore should not be construed as being limiting in any way.

It is understood that FIG. 1 illustrates one or more instances of the network 102, the web servers 103, the access point 104, the web domains 105A-N, the network transport resources 106, the network resource controller 107, the data tonnage assessment service 108, the core network device 110, the session probe 112, the network data store 114, the MSP 116, the core router 118, the PGW 120, the session management function 122, the user plane function 124, the user 129, the UE 130, the processor 131, the communication components 132, the memory 133, the applications 134A-N, the locked API 135, the data usage sessions 136A-N, the simultaneous usage session 137, the UE identifier 138, the data lake 140, the raw domain mapping 142, the targeted domains 144A-N, the branch domains 146A-N, the locked API application map 143, the network session server 150, the processor 151, the communication interface 152, the memory 153, the SSAS 154, the simultaneous session analysis tool 155, the client access portal 156, the session state machine 157, the raw session records 160A-N, the targeted domain session identifiers 162A-N, the raw session timeout periods 164A-N, the session boundary data 166A-N, the raw data records 168A-N, 170A-N, 172A-N, the stitched session sequence record 180, the stitched session sequence map 182, the rejected session record 184, the cotemporal time stamp 185, the rejected session record identifier 186, the domain reconfiguration message 188, the resource reconfiguration command 190, and the raw mobile data set 202. It should be understood, however, that various implementations of the operating environment 100 can include zero, one, or more than one of these elements of the operating environment 100 shown in FIG. 1. As such, the illustrated embodiment of the operating environment 100 should be understood as being illustrative and should not be construed as being limiting in any way.

It is understood that FIG. 2 illustrates one or more instances of the raw mobile data set 202, the initiated requests 204, the unsolicited bot messages 206, the cotemporal time stamps 208A-N, the initiated request strings 210A-N, 214A-N, and 218A-N, the unsolicited strings 212A-N, 216A-N, and 220A-N, the targeted domain session identifiers 162A-N, the raw data records 168A-N, the raw data records 170A-N, the raw data records 172A-N, the stitched session sequence record 180, the raw session records 160A-N, the targeted domains 144A-N, and the branch domains 146A-N. It should be understood, however, that various implementations of the block diagram 200 can include zero, one, or more than one of these elements shown in FIG. 2. As such, the illustrated embodiment of the block diagram 200 should be understood as being illustrative and should not be construed as being limiting in any way.

Figure 3:
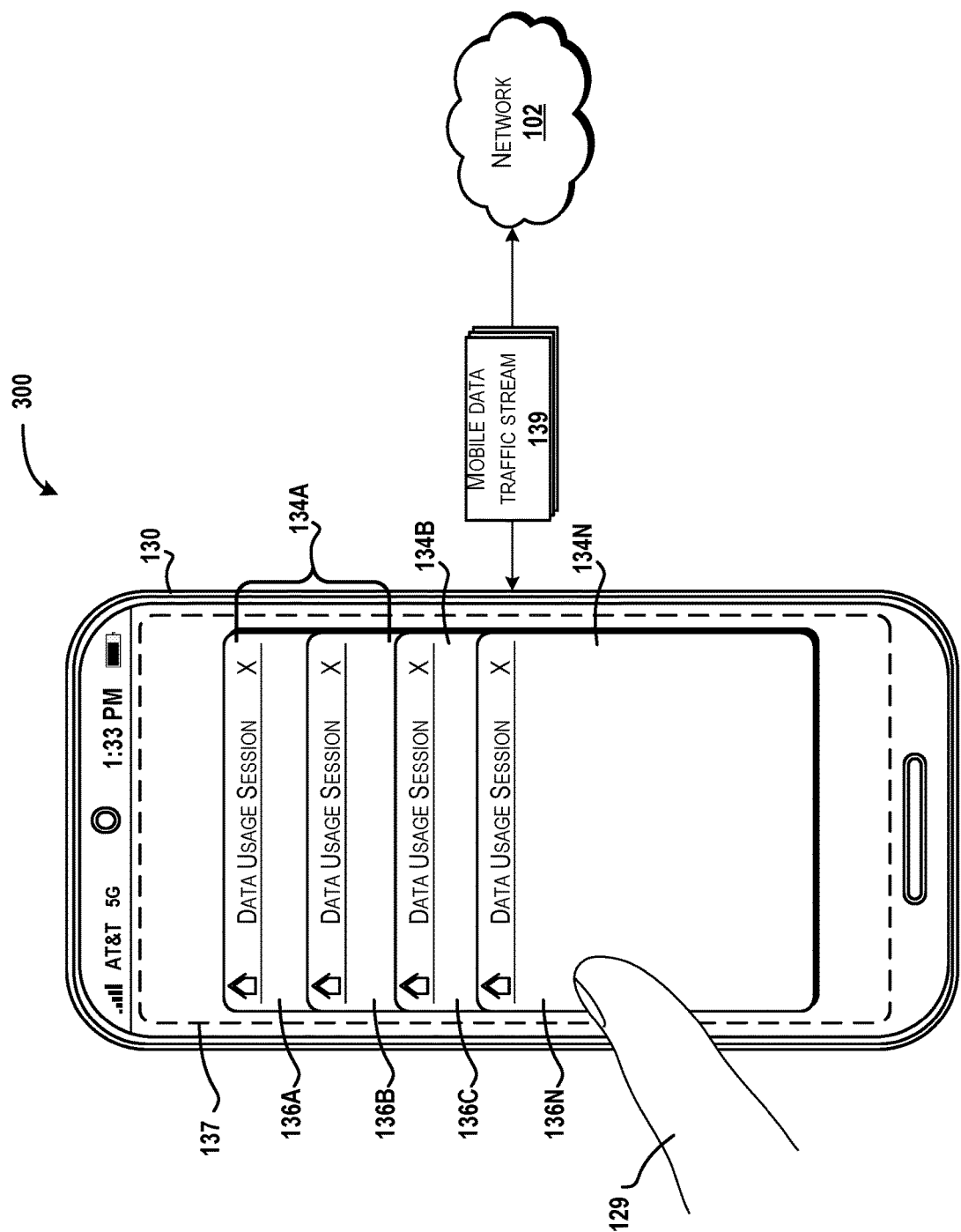
FIG. 3 is a user interface diagram showing an example screen display of a user equipment engaging in a simultaneous usage session, according to an illustrative embodiment of the concepts and technologies described herein.

Turning now to FIG. 3, with continued reference to FIGS. 1 and 2, an example of a screen display 300 is provided, according to an embodiment. As shown in FIG. 3, the user 129 can provide input and cause interactions to occur on a user interface of the UE 130. For example, in an embodiment, the user 129 can provide input that launches one or more applications that generate the mobile data traffic stream 139 between the UE 130 and the network 102. In an embodiment, a plurality of data usage sessions can occur on the UE 130, such as the data usage sessions 136A, 136B, 136C, and 136N. In some embodiments, one or more of the data usage sessions 136A-N can correspond with the same application on the UE 130, such as any of the applications 134A-N. In some embodiments, the data usage sessions 136A-N is based on execution of, and thus corresponds with, two or more of the applications 134A-N. In the embodiment of the screen display 300 shown in FIG. 3, each of the data usage sessions 136A and 136B corresponds with the application 134A, while the data usage sessions 136C and 136N correspond with the applications 134B and 134N, respectively. As such, the UE 130 can have multiple applications executing concurrently, which in turn can cause the cotemporal occurrence of the data usage sessions 136A-N, thereby resulting in the simultaneous usage session 137. It is understood that one or more of the applications 134A-N can correspond and have an instance of the locked API 135, and therefore may not allow the SSAS 154 to obtain direct access to the application. It is also understood that the screen display 300 may only show a user interface corresponding to one of the data usage sessions 136A-N, while the remaining data usage sessions execute in the background. The cotemporal execution and/or occurrence of the data usage sessions 136A-N that lead to the simultaneous usage session 137 can generate instances of information that are carried in the mobile data traffic stream 139, which may include any of the information included in the raw mobile data set 202, such as but not limited to instances of the initiated requests 204, the unsolicited bot messages 206, the cotemporal time stamps 206A-N, the initiated request strings 210A-N, 214A-N, 218A-N, and/or the unsolicited strings 212A-N, 216A-N, 220A-N. It should be understood that the examples provided are for illustration purposes only, and therefore should not be construed as limiting in any way.

It should be appreciated that the UI diagram illustrated in FIG. 3 is provided for illustration purposes to provide one contemplated example of a user interface that can be generated and/or displayed in accordance with the concepts and technologies disclosed herein, and therefore should not be construed as being limiting in any way. The buttons, controls, displays, and/or other information shown in the embodiments of the screen display 300 are illustrative and the screen display 300 can include various menus, options, fields, buttons, or other information not shown in FIG. 3. Because additional or alternative buttons and information can be included in the screen display 300 it should be understood that the example embodiments shown in FIG. 3 are illustrative and therefore should not be construed as limiting in any way.

Regarding FIGS. 4A and 4B, aspects of methods associated with mobile network handling of simultaneous usage sessions, such as the simultaneous usage session 137, will be described in detail, according to one or more illustrative embodiment. It should be understood that the operations of the methods disclosed herein (e.g., the methods 400 and 450) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It is understood that operations shown in one method may be performed in another method. It is also understood that aspects of the discussion with respect to FIGS. 1-3 may also be included in a method, according to the concepts and technologies discussed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof (e.g., computer-executable instructions), as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Therefore, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the network session server 150, to perform one or more operations and/or causing the processor to direct other components of the computing system or device to perform one or more of the operations.

For purposes of illustrating and describing the concepts of the present disclosure, the methods 400 and 450 disclosed herein are described as being performed, at least in part, by the network session server 150 via execution of one or more computer-readable instructions such as, for example, the SSAS 154 and/or the simultaneous session analysis tool 155, that configure one or more processors, such as one or more instances of the processor 151, and/or configure other devices, such as one or more instance of the core network device 110 and/or the network transport resources 106. It should be understood that additional and/or alternative devices can provide the functionality described herein via execution of one or more modules, applications, and/or other software including, but not limited to, the network resource controller 107 and/or the applications 134A-N that can execute and configure a device, such as but not limited to the network transport resources 106 and/or the UE 130, respectively. Thus, the illustrated embodiments are illustrative, and should not be viewed as being limiting in any way.

Figure 4A:
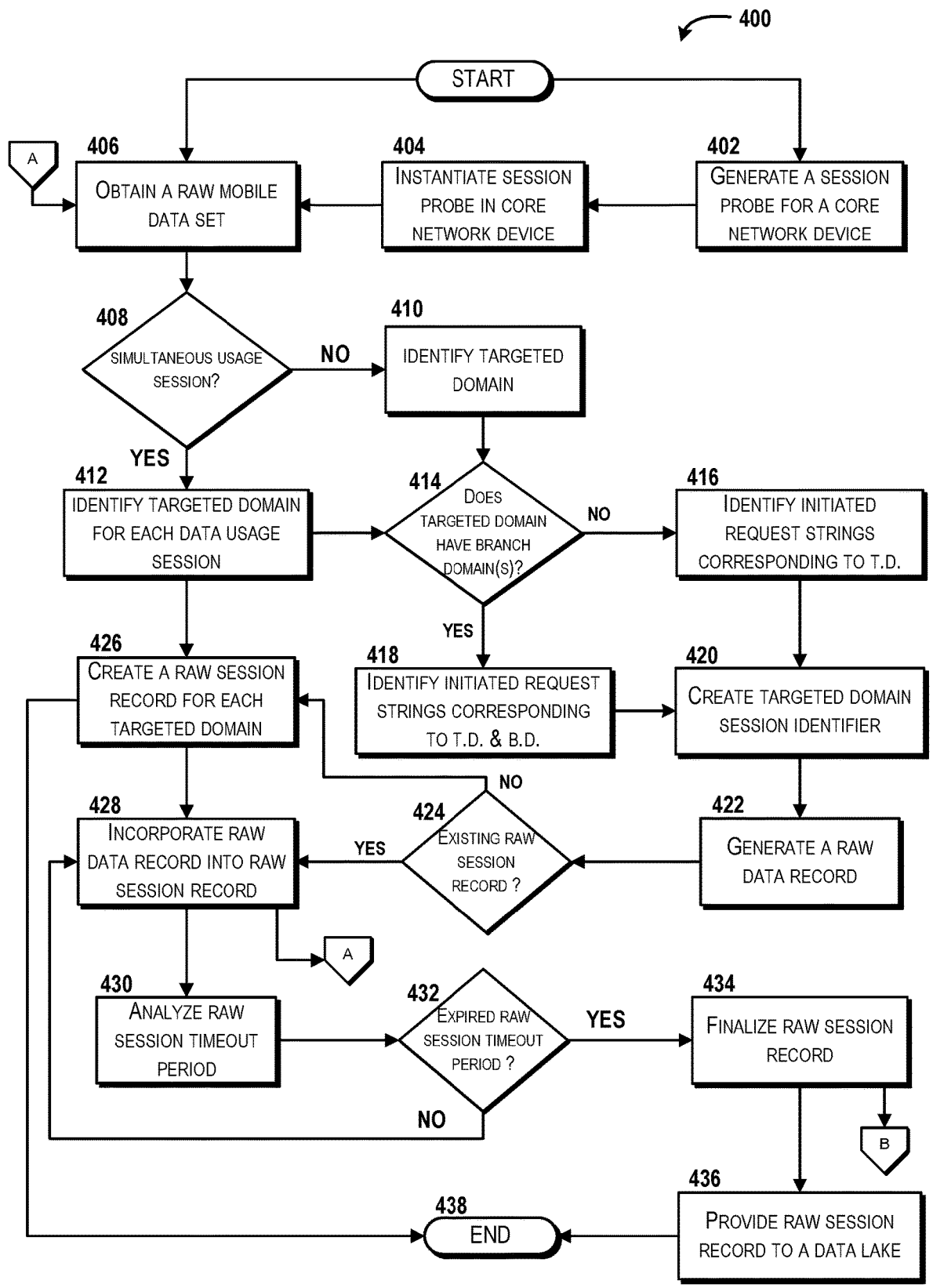
FIG. 4A is a flow diagram showing aspects of a method for handling a simultaneous usage session according to an illustrative embodiment of the concepts and technologies described herein.

Turning now to FIG. 4A, aspects of the method 400 for mobile network handling of simultaneous usage sessions will be discussed, according an embodiment. In some embodiments, the method 400 can begin and proceed to operation 402. In some embodiments, the method 400 may begin and proceed to operation 406. For clarity, a discussion of operation 402 will be provided, followed by a discussion of operation 406. At operation 402, the SSAS 154 can generate a session probe, such as an instance of the session probe 112, that is configured to analyze an instance of the core network device 110. For example, in some embodiments, the session probe 112 can be configured to monitor, analyze, and record the mobile data traffic stream 139 passing through the MSP 116 so as to generate an instance of the raw mobile data set 202. From operation 402, the method 400 can proceed to operation 404, where the SSAS 154 can instantiate the session probe 112 in an instance of the core network device 110, such as the MSP 116. In some embodiments, the raw mobile data set 202 is generated by the core network device 110, and in turn the session probe 112 accesses the MSP 116 in order to obtain an instance of the raw mobile data set 202. In some embodiments, the session probe 112 may be given access credentials to the core network device 110 such that the mobile data traffic stream 139 can be observed and the raw mobile data set 202 can be obtained without impeding routing of the mobile data traffic stream 139 to one of the web domains 105A-N. By this, the session probe 112 can allow the web servers 103 to remain stateless and enable the core network device 110 to operate without draining processing resources. In some embodiments, the session probe 112 has access to the network data store 114, and in some embodiments may have access at a root level of the core network device 110, thereby enabling the SSAS 154 to obtain an instance of the raw mobile data set 202 directly from the network data store 114 without requesting permission from the core network device 110, which may improve processing on the core network device 110 by limiting the amount of processing resources allocated to the session probe 112. It is understood that the examples provided are for illustration purposes only, and therefore should not be construed as limiting in any way.

From operation 404, the method 400 can proceed to operation 406, where the SSAS 154 can obtain, from the session probe 112 within the core network device 110, the raw mobile data set 202 that is associated with the mobile data traffic stream 139 that was created by the data usage sessions 136A-N from the UE 130.

From operation 406, the method 400 can proceed to operation 408, where the SSAS 154 can determine whether the UE 130 is engaging in a simultaneous usage session based on the raw mobile data set 202. For example, the SSAS 154 determines a simultaneous usage session is occurring (and/or has occurred) when the raw mobile data set 202 indicates that a plurality of data usage sessions (e.g., the data usage sessions 136A-N) are occurring cotemporally on the UE 130. In some embodiments, the SSAS 154 can determine that the data usage sessions 136A-N are occurring cotemporally on the UE 130 based on a plurality of initiated request strings (e.g., any of the initiated request strings 210A-N, 214A-N, and/or 218A-N) and/or unsolicited strings (e.g., the unsolicited strings 212A-N, 216A-N, and/or 220A-N) having cotemporal time stamps, such as one or more of the cotemporal time stamps 208A-N. The data usage sessions 136A-N can provide information to the network 102 via the mobile data traffic stream 139, the initiated request strings 210A-N, 214A-N, and/or 218A-N and/or the unsolicited strings 212A-N, 216A-N, and/or 220A-N that are included in the raw mobile data set 202. In some embodiments, the plurality of initiated request strings 210A-N, 214A-N, and/or 218A-N and/or the plurality of unsolicited strings 212A-N, 216A-N, and/or 220A-N that correspond with one or more of the plurality of data usage sessions 136A-N may be intermingled within the raw mobile data set 202. As such, the SSAS 154 may not rely solely on the order in which the data is presented within the raw mobile data set 202 to determine a sequence or chronology of interactions that caused the data to be provided. In some embodiments, the SSAS 154 may determine that the UE 130 is not engaging in the simultaneous usage session 137 when the raw mobile data set 202 does not include cotemporal time stamps corresponding to multiple instances of the data included therein, such as pertaining to the initiated request strings and/or the unsolicited strings. The lack of cotemporal time stamps can indicate that the UE 130 was not engaging in multiple data usage sessions at the same time. It should be understood that the examples provided are for illustration purposes only, and therefore should not be construed as limiting in any way.

Therefore, if the SSAS 154 determines that the UE 130 engages (i.e., is engaging and/or has engaged) in the simultaneous usage session 137, then the method 400 may proceed along the YES path to operation 412. If the SSAS 154 determines that the UE 130 is not engaging in the simultaneous usage session 137, then the method 400 may proceed along the NO path to operation 410. For clarity, a discussion of operation 410 will be provided first, followed by a discussion of operation 412. At operation 410, the SSAS 154 can analyze the raw mobile data set 202 to identify a targeted domain (e.g., one of the targeted domains 144A-N) corresponding to the particular data usage session that was occurring on the UE 130. At operation 412, the SSAS 154 can identity the targeted domains for each of the data usage sessions 136A-N, such as any of the targeted domains 144A-N. The SSAS 154 can identify one or more targeted domain by analyzing the raw mobile data set 202, accessing the raw domain mapping 142, and determining which of the targeted domains 144A-N are present within the raw mobile data set 202. In some embodiments, the method 400 may proceed from operation 412 to operation 426, which will be discussed below. For clarity, a discussion of operation 414 will be provided first.

From either operation 412 or 410, the method 400 may proceed to operation 414, where the SSAS 154 can determine whether the targeted domains that were identified as being present within the raw mobile data set 202 correspond with one or more branch domains (e.g., any of the branch domains 146A-N). As discussed with respect to FIG. 1, instances of a branch domain represent one of the web domains 105A-N which are arrived at based on a link or pointer within the targeted domain that redirects the particular data usage session to the branch domain. In some embodiments, multiple branch domains can correspond with one of the targeted domains. In some embodiments, one of the web domains 105A-N may be represented within the raw domain mapping 142 as being a branch domain when that particular web domain was arrived at due to a link from a corresponding targeted domain. For example, the web domain 105A may be represented within the raw domain mapping 142 as the targeted domain 144A, and the web domain 105B may be represented in the raw domain mapping as the branch domain 146A because the web domain 105B was arrived at via the web domain 105A (i.e., arrived at from the targeted domain 144A).

In some embodiments, if the raw domain mapping 142 indicates that a targeted domain does not correspond or otherwise have branch domains, then the method 400 can proceed along the NO path to operation 416, where the SSAS 154 can identify the initiated request strings within the raw mobile data set 202 that correspond with the targeted domain. The SSAS 154 may ignore or omit the unsolicited strings from consideration because they are not presented within the raw domain mapping 142. From operation 416, the method 400 can proceed to operation 420, which is discussed below.

Returning to operation 414, if the SSAS 154 determines that the targeted domain has branch domains based on analysis of the raw domain mapping 142, then the method 400 can proceed along the YES path to operation 418, where the SSAS 154 can determine and identify which of the initiated request strings 210A-N, 214A-N, and/or 218A-N corresponds with one of the targeted domains and/or branch domains. For example, the SSAS 154 can identify, within the raw mobile data set 202, which of the initiated request strings 210A-N, 214A-N, and/or 218A-N corresponds with a first or second targeted domain (e.g., the targeted domains 144A and 144B) or one of the corresponding branch domains (e.g., the branch domains 146A and 146B which correspond with the targeted domains 144A and 144B, respectively). From operation 418, the method 400 can proceed to operation 420.

At operation 420, the SSAS 154 can create an instance of a targeted domain session identifier that is applied to the initiated request strings for a corresponding targeted domain and any branch domains that stem from the targeted domain. The SSAS 154 can create a targeted domain session identifier so as to indicate the targeted domain that initiated the data usage session, thereby associating any initiated request strings for a branch domain (e.g., the initiated request strings 210B and 210N) with an initiated request string for a targeted domain (e.g., the initiated request string 210A). In some embodiments, a targeted domain session identifier can be formatted in a syntax that can be appended to any of the initiated request strings within raw mobile data set 202.

From operation 420, the method 400 can proceed to operation 422, where the SSAS 154 can generate a raw data record based on a targeted domain session identifier and an initiated session request for a corresponding target domain. For example, the SSAS 154 can append the targeted domain session identifier 162A to each of the initiated request strings 210A-N, where appending the targeted domain session identifier 162A to each of the initiated request strings 210A-N generates the raw data records 168A-N, respectively. Similarly, the targeted domain session identifier 162B for the targeted domain 144B can be appended to the initiated request strings 214A-N so as to generate the raw data records 170A-N, and the targeted domain session identifier 162N for the targeted domain 144N can be appended to the initiated request strings 218A-N so as to generate the raw data records 172A-N. In some embodiments, additional raw data records may be generated for a targeted domain as the simultaneous usage session 137 continues to occur and additional initiated request strings are added to the raw mobile data set 202.

From operation 422, the method 400 may proceed to operation 424, where the SSAS 154 may determine whether a corresponding raw session record (pertaining to the targeted domain indicated by the raw session record) already exists. For example, if the raw session record 160A has already been created and already exists for the targeted domain 144A (which can correspond to the data usage session 136A of the simultaneous usage session 137), then the SSAS 154 can indicate that one or more raw data records associated with the corresponding targeted session identifier (e.g., the targeted domain session identifier 162A) can be added or otherwise incorporated into the raw session record 160A. Therefore, if the corresponding raw session record already exists, then the method 400 may proceed along the YES path from operation 424 to operation 428, which is discussed below. If a raw session record corresponding to the targeted session identifier (and thus a particular targeted domain) does not exist or is otherwise not available (e.g., due to being finalized and no longer authorized for inclusion of additional raw data records, such as discussed below with respect to operation 434), then the method 400 may proceed along the NO path from operation 424 to operation 426. For clarity, a discussion of operation 426 will be provided first, followed by a discussion of operation 428.

At operation 426, the SSAS 154 can create a raw session record for each targeted domain associated with a simultaneous usage session, such as the raw session records 160A-N for the simultaneous usage session 137. In some embodiments, multiple instances of a raw session record may exist for the same targeted domain, however each raw session record may indicate a different usage session based on the elapse of a raw session timeout period for the raw session record. For example, the targeted domain 144A may correspond with the web domain 105A. In this example, a raw session record 160A may be created to capture a period in time in which the raw data records 168A-N were a part of the simultaneous usage session 137 and indicated the targeted domain session identifier 162A for being directed towards the targeted domain 144A and/or the branch domain 146A. The SSAS 154 may create and incorporate a raw session timeout period for a particular raw session record, and therefore the raw data records may no longer be added to the raw session record after the raw session timeout period ends. Therefore, in this example, there may exist a previous raw session record that was also associated with the targeted domain 144A, however the raw session timeout period for the raw session record may have ended because the user 129 was no longer engaging on their UE 130, thereby causing a timeout to occur. As such, the SSAS 154 may create an instance of a simultaneous usage session when there exists raw data records which correspond with a targeted domain session identifier and these raw data records cannot otherwise be incorporated into an existing raw session record. In each of the raw session records 160A-N, the SSAS 154 can include a parameter that indicates the corresponding raw session timeout period (e.g., the raw session timeout periods 164A-N), which can enable the SSAS 154 to determine whether the corresponding data usage session has timed out, thereby indicating when raw data records should cease being incorporated into the raw session record. From operation 426, the method 400 may proceed to operation 438, where the method 400 can end. In some embodiments, from operation 426, the method 400 may proceed to operation 428.

At operation 428, the SSAS 154 can incorporate one or more of the raw data records having a corresponding targeted domain session identifier for a particular targeted domain into a corresponding raw session record. For example, the SSAS 154 can incorporate each of the raw data records 168A-N into the raw session record 160A for the targeted domain 144A based on each of the raw data records 168A-N having the targeted domain session identifier 162A (which can correspond with the data usage session 136A). Similarly, the raw data records 170A-N can be incorporated into the raw session record 160B based on the targeted domain session identifier 162B corresponding to the targeted domain 144B, and the raw data records 172A-N can be incorporated into the raw session record 160N based on the targeted domain session identifier 162N corresponding to the targeted domain 144N. In some embodiments, a raw data record may be incorporated into a corresponding raw session record after other raw data records have already been incorporated into the raw session record. In some embodiments, incorporation of raw data records into a raw session record may continue to be authorized until the SSAS 154 indicates otherwise, such as based on a raw session timeout period discussed below. It is understood that the examples provided are for illustration purposes only, and therefore should not be construed as limiting in any way. In some embodiments, the method 400 may proceed from operation 428 to operation 406 in order to repeat one or more operations which are discussed herein.

In some embodiments, from operation 428, the method 400 may proceed to operation 430, where the SSAS 154 and/or the session state machine 157 may analyze a raw session timeout period corresponding to one of the raw session records (e.g., any of the raw session timeout periods 164A-N corresponding to the raw session records 160A-N) to identify a time parameter indicating the amount of time in which raw data records may continue to be incorporated into the corresponding raw session record. As the plurality of data usage sessions of the simultaneous usage session continues to occur, the raw mobile data set 202 may continue to receive, generate, and/or record initiated request strings that can be used to generate raw data records for a particular raw session record. As such, a raw session timeout parameter can indicate when the data usage session has expired or otherwise timed-out (i.e., when raw data records should no longer be added to the raw session record), which may be caused due to inactivity by the UE 130.

From operation 430, the method 400 may proceed to operation 432, where the SSAS 154 and/or the session state machine 157 can determine whether the raw session timeout period for a corresponding raw session record has expired. If the raw session timeout period for a corresponding raw session record has not expired, and thus there still remains time to incorporate additional raw data records within the raw session record, then the method 400 can proceed along the NO path to operation 428, where additional raw data records can continue to be incorporated within the corresponding raw session record for a particular data usage session. If the raw session timeout period has expired, then the method 400 may proceed along the YES path to operation 434.

At operation 434, the SSAS 154 can finalize one or more of the raw session records 160A-N for each of the corresponding targeted domains 144A-N based on the raw session timeout period (e.g., a one of the respective raw session timeout period 164A-N expiring). In some embodiments, finalizing a raw session record can include creating an instance of session boundary data (e.g., a corresponding instance of one of session boundary data 166A-N). An instance of the session boundary data can indicate the start time and end time of the data usage session as it pertains to the simultaneous usage session 137. Therefore, when the user 129 no longer interacts with a particular targeted domain and/or branch domain within one of the data usage sessions 136A-N, the session boundary data can indicate the time when that data usage session joined (i.e., started to belong to) the simultaneous usage session 137 and the time when the data usage session ceased (i.e., stopped) belonging to the simultaneous usage session 137. In some embodiments, the session boundary data may include an indication as to the amount of interactions (e.g., user inputs) during the data usage session for a particular targeted domain and/or branch domain. It is understood that the examples provided are for illustration purposes only, and therefore should not be construed as limiting in any way.

In some embodiments, the method 400 may proceed from operation 434 to one or more operation discussed with respect to FIG. 4B discussed below. In some embodiments, the method 400 may proceed from operation 434 to operation 436, where the SSAS 154 may provide one or more of the raw session records 160A-N to the data lake 140 such that the raw data records within the raw session records 160A-N can be accessed directly from the data lake 140 instead of reliance on the raw mobile data set 202, which in turn can improve network performance by reducing the time for retrieval from memory when requested from the client access portal 156. The data lake 140 can be accessed by the data tonnage assessment service and/or the SSAS 154, and therefore if the client access portal 156 receives a request to retrieve data pertaining to any simultaneous usage session on the UE 130, the SSAS 154 may query and retrieve the raw session records 160A-N and/or the stitched session sequence record 180 from the data lake 140 instead of attempting to query the raw mobile data set 202. In various embodiments, the raw session records 160A-N and/or the stitched session sequence record 180 can be provided to the data lake 140 in response to one or more of the raw session records 160A-N and/or the stitched session sequence record 180 being finalized. It should be understood that these examples are illustrative and therefore should not be construed as being limiting in any way.

From operation 436, the method 400 may proceed to operation 438, where the method 400 can end.

Figure 4B:
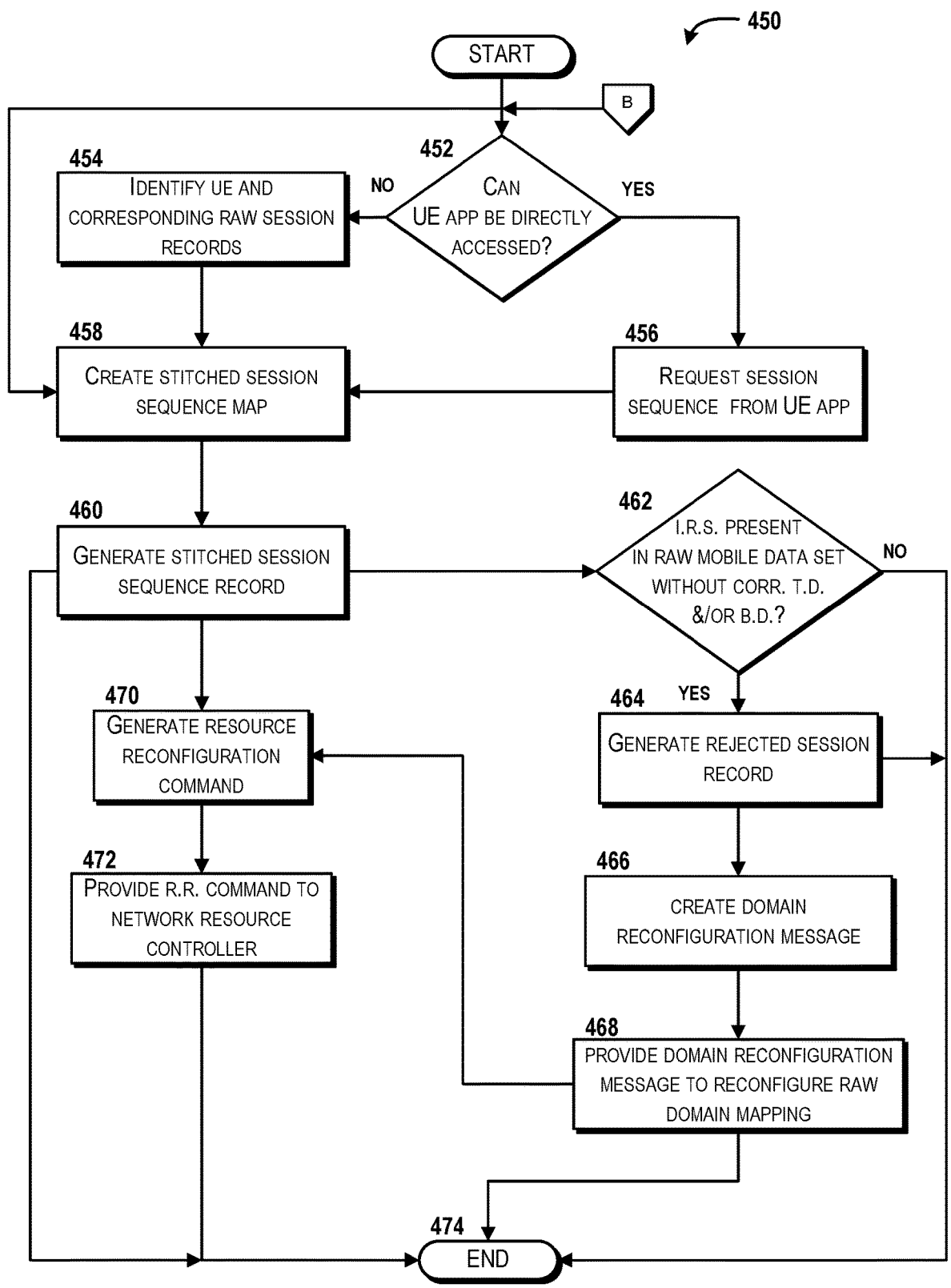
FIG. 4B is a flow diagram showing aspects of another method for handling a simultaneous usage session, according to an illustrative embodiment of the concepts and technologies described herein.

Turning now to FIG. 4B, aspects of a method 450 for providing mobile network handling of simultaneous usage session will be discussed, according another embodiment. In some embodiments, the method 450 may proceed from one or more operations discussed with respect to the method 400, such as but not limited to the operation 434. In some embodiments, the method 450 can begin and proceed to operation 452, although this may not necessarily be the case. In some embodiments, the method 450 may begin and proceed directly to operation 458. For clarity, a discussion of operation 452 will be provided first, followed by a discussion of operation 458 below.

At operation 452, the SSAS 154 can determine whether an application of the UE 130 can be accessed directly, such as by determining whether the application has a locked application programming interface (e.g., the applications 134A-N that have an instance of the locked API 135). For example, the SSAS 154 can determine which application on the UE 130 generated information included in one of the raw session records (e.g., the raw session records 160A-N corresponding to the UE 130). The SSAS 154 can access the data lake 140 can activate the locked API application map 143 to determine whether the application—which generated initiated request strings from the raw mobile data set 202, which in turn were used to generate the raw session records 160A-N (e.g., any of the initiated request strings 210A-N, 214A-N, and/or 218A-N generated from the applications 134A-N and used to create the raw session records 160A-N)—has a locked API. If the identity of the application on the UE 130 corresponding to a particular initiated request string (e.g., any of the initiated request strings 210A-N, 214A-N, and/or 218A-N) is indicated on the locked API application map 143, then the SSAS 154 determines that the particular application corresponds with an instance of the locked API 135, and therefore cannot be directly accessed by the SSAS 154 and/or the session probe 112.

If the SSAS 154 determines that the application on the UE 130 (e.g., one of the applications 134A-N) can be directly accessed, such as by the SSAS 154 and/or the session probe 112, then the method 450 can proceed along the YES path from operation 452 to operation 456, where the SSAS 154 can request the application on the UE 130 to provide a session sequence indicating the order in which certain initiated request strings (e.g., any of the initiated request strings 210A-N) were requested, and in some instances, the amount of time which the user 129 spent on the particular application. In some embodiments, the SSAS 154 can use the information obtained directly from the application on the UE 130 to create a stitched session sequence map, such as the stitched session sequence record 180, which is discussed below with respect to operation 460. From operation 456, the method 450 can proceed to operation 458. For clarity, a discussion of operation 458 is provided after operation 454 is discussed below.

Returning to operation 452, if the SSAS 154 determines that the application on the UE 130 (e.g., one of the applications 134A-N corresponding to one of the initiated request strings 210A-N, 214A-N, and/or 218A-N that have cotemporal time stamps 208A-N) cannot be accessed directly based on a locked API (e.g., the locked API 135), then the method 450 may proceed along the NO path from operation 452 to operation 454. At operation 454, the SSAS 154 can identity the UE 130 (e.g., via the UE identifier 138) and corresponding raw session records (e.g., the raw session records 160A-N) which were generated based on the raw mobile data set 202 and the mobile data traffic stream 139. The raw session records 160A-N can indicate that the raw data records included therein (e.g., the raw data records 168A-N, 170A-N, and/or 172A-N within the raw session records 160A, 160B, and 160N, respectively) correspond with cotemporal initiated request strings from the raw mobile data set 202, and therefore form a basis for creating a stitched session sequence record 180.

In some embodiments, from operation 454, the method 450 can proceed to operation 458. In some embodiments, the method 450 may begin and proceed to operation 458. At operation 458, the SSAS 154 can create an instance of the stitched session sequence map 182. In some embodiments, if the SSAS 154 obtains a session sequence from the UE 130 because an API is not locked, then the SSAS 154 can use the session sequence to create a stitched session sequence map 182. In other embodiments, the SSAS 154 can use the raw data records 168A-N, 170A-N, and/or 172A-N to create the stitched session sequence map 182. The stitched session sequence map 182 can provide a chronology of interactions that occur on the applications 134A-N of the UE 130 based on the raw session records 160A-N despite the UE 130 engaging in the simultaneous usage session 137 that generated the initiated request strings (e.g., the initiated request strings 210A-N, 214A-N, and 218A-N) with cotemporal time stamps 208A-N. Specifically, the stitched session sequence map 182 can indicate that the raw session records 160A-N occurred cotemporally from the network perspective, while also enabling creation of a chronologically ordered sequence that indicates which of the initiated request strings 210A-N, 214A-N, and 218A-N correspond with and/or are dependent (or otherwise stem from) each other. For example, the raw session record 160A indicates that the raw session records 160B and 160N occurred cotemporally on the UE 130, while also demonstrating that the raw data records 168B and 168N were generated based on user input for the initiated request string 210A, which is the raw data record 168A for the targeted domain 144A.

In some embodiments, the amount of raw data records within a particular raw session record can indicate the amount of time spent and interaction that the user 129 provided based on a particular targeted domain using a corresponding one of the applications 134A-N on the UE 130. For example, if the user 129 launches a browser application (e.g., one of the application 134A-N) to request visitation to the web domain 105A, then launches simultaneous tabs to create cotemporal data usage sessions that target the web domains 105B and 105N, then the SSAS 154 may use the corresponding initiated request strings in the raw mobile data set 202 to create the raw session records 160A-N, respectively. Any of the unsolicited bot messages 206 that occur within the mobile data traffic stream 139 due to visitation of the web domains 105A-N is omitted, by the SSAS 154, from the raw session records 160A-N, and instead the frequency of initiated request strings for branch domains (e.g., the initiated request strings 210B and 210N directed towards the branch domains 146A) stemming from the targeted domain (e.g., based on visitation to the web domain 105A corresponding to the targeted domain 144A which enabled the user 129 to provide input selection on the targeted domain 144A to generated the initiated request strings 210B and 210N directed to the branch domain 146A) can be recorded. By this, the SSAS 154 can provide mobile network handling of the simultaneous usage session 137 such that the chronological sequence of operations can be determined on the UE 130 without the SSAS 154 gaining direct access to the applications 134A-N (due to one or more instances of the locked API 135). Additionally, the operations discussed herein, such as creation of the stitched session sequence map 182, can improve the technical field of communication networks and processing resource allocation because the web servers 103 corresponding to the web domains 105A-N being targeted can operate with stateless restrictions, thereby allowing conformance with a REST architecture and enabling determination of session sequencing despite the simultaneous usage session 137.

From operation 458, the method 450 can proceed to operation 460, where the SSAS 154 can generate the stitched session sequence record 180. For example, in an embodiment where operation 456 is preceded by operation 460, the SSAS 154 can use the information about session sequence that was received from the one or more user equipment applications that did not have a locked API in order to form a chronology of data usage sessions, however this may not be the case in every instance. In other embodiments where the applications 134A-N have instance of the locked API 135, and therefore cannot directly access the applications 134A-N to obtain information about the sequence of the data usage sessions 136A-N, then the stitched session sequence record 180 can be generated based on the stitched session sequence map 182, such as discussed with respect to operation 458. The stitched session sequence map 182 can be incorporated into the stitched session sequence record 180 so as to provide a chronologically ordered sequence of the raw session records 160A-N and/or raw data records included therein (e.g., the raw data records 168A-N, 170A-N, and/or 172A-N). The stitched session sequence map 182 within the stitched session sequence record 180 can indicate and provide the sequence and chronology of interactions from the applications 134A-N that generated the simultaneous usage session 137, specifically via ordering and stitching one or more (or all) of the cotemporal raw data records (e.g., the raw data records 168A-N, 170A-N, and/or 172A-N) together so as to indicate a sequence and chronology of interactions across multiple domains, such as any of the web domains 105A-N. In some embodiments, the stitched session sequence record 180 can include and/or point to one or more of the raw session records 160A-N that are cotemporal (e.g., based on the cotemporal time stamps 208A-N) and correspond with the simultaneous usage session 137 from the UE 130. The stitched session sequence record 180 may be accessible via the client access portal 156, and in turn can enable the simultaneous sequence analysis tool 115 to analyze and present the stitched session sequence record 180 on a display device, such as to a network administrator. In some embodiments, the method 450 can proceed from operation 460 to operation 474, where the method 450 can end. In some embodiments, the method 450 can proceed from operation 460 to operation 470, which will be discussed below in further detail. In some embodiments, the method 450 can proceed from operation 460 to operation 462. For clarity, a discussion of operation 462 will proceed first, followed by a discussion of operation 470 below.

At operation 462, the SSAS 154 can determine whether any initiated request strings within the raw mobile data set 202 remain that do not correspond with one of the targeted domains 144A-N or the branch domains 146A-N. Stated differently, the SSAS 154 can verify that all of the instances of the initiated request strings 210A-N, 214A-N, and 218A-N of the raw mobile data set 202 correspond with an entry in the raw domain mapping 142 (e.g., one of targeted domains 144A-N or branch domains 146A-N). In some embodiments, in response to determining that all initiated request strings (e.g., all of the 210A-N, 214A-N, and 218A-

N) correspond with at least one of the targeted domains and/or branch domains in the raw domain mapping 142, then the method 450 can proceed along the NO path to operation 474, where the method 450 can end. In some embodiments, in response to determining that at least one of the initiated request strings within the raw mobile data set does not correspond with a targeted domain and/or a branch domain within the raw domain mapping 142, then the method 450 can proceed along the YES path to operation 464.

At operation 464, the SSAS 154 can generate a rejected session record based on one or more initiated request strings that are not accounted for in the raw domain mapping 142 (i.e., do not correspond with at least one targeted domain and/or branch domain). For example, if the initiated request string 218N did not correspond with the branch domain 146N (as shown in FIG. 2), but instead was unaccounted for and corresponded with one of the web domains 105A-N which was not included within the raw domain mapping 142, then the SSAS 154 can create a rejected session record identifier 186 and append it to the initiated request string 218N so as to create the rejected session record 184. In some embodiments, the rejected session record 184 can further include a cotemporal time stamp 185 to indicate that the rejected session record 184 is associated with the stitched session sequence record 180 and/or the raw session records 160A-N and indicate that it was not included in the stitched session sequence record 180. In some embodiments, the rejected session record identifier 186 can indicate which of the web domains 105A-N is not found within the raw domain mapping 142. In some embodiments, the method 450 can proceed from operation 464 to operation 474, where the method 450 can end. In some embodiments, the method can proceed from operation 464 to operation 466.

At operation 466, the SSAS 154 can create a domain reconfiguration message, such as the domain reconfiguration message 188. The domain reconfiguration message 188 can be configured to include the rejected session record 184 that indicates the web domain (e.g., any of the web domains 105A-N) that was rejected (i.e., pertaining to the initiated request string 218N within the raw mobile data set 202 that was rejected and not included within one of the raw session records 160A-N). The domain reconfiguration message 188 can instruct the raw domain mapping 142 to be reconfigured based on the rejected session record 184, specifically by recording the corresponding web domain indicated by the rejected session record identifier 186 (which is one of the web domains 105A-N that is not found within the raw domain mapping 142 as a targeted domain or branch domain).

From operation 466, the method 450 can proceed to operation 468, where the SSAS 154 can provide the domain reconfiguration message 188 to the data lake 140 so as to reconfigure the raw domain mapping 142 based on the rejected session record 184. In some embodiments, the method 450 can proceed from operation 468 to operation 474, where the method 450 can end. In some embodiments, the method 450 can proceed from operation 468 to operation 470.

At operation 470, the SSAS 154 can generate a resource reconfiguration command, such as the resource reconfiguration command 190. The resource reconfiguration command 190 can instruct the network resource controller 107 to reallocate or otherwise reconfigure the network transport resources 106 to as to adjust processing resources, memory resources, and/or communication resources that are available to the core network device 110 based on the amount of initiated request strings corresponding to the simultaneous usage session 137 and the raw session records 160A-N.

From operation 470, the method 450 can proceed to operation 472, where the SSAS 154 can provide the resource reconfiguration command 190 to the network resource controller 107. By this, the network session server 150 can enable dynamic allocation and adjustment of the network transport resources 106 without instructing the web servers to maintain session state (i.e., maintain conformity to a stateless protocol, such as REST), which in turn may improve functionality of the core network device 110 and/or the network session server 150 through proper allocation and dynamic adjustment of the computing resources that should be used. From operation 472, the method 450 may proceed to operation 474, where the method 450 can end.

Figure 5:
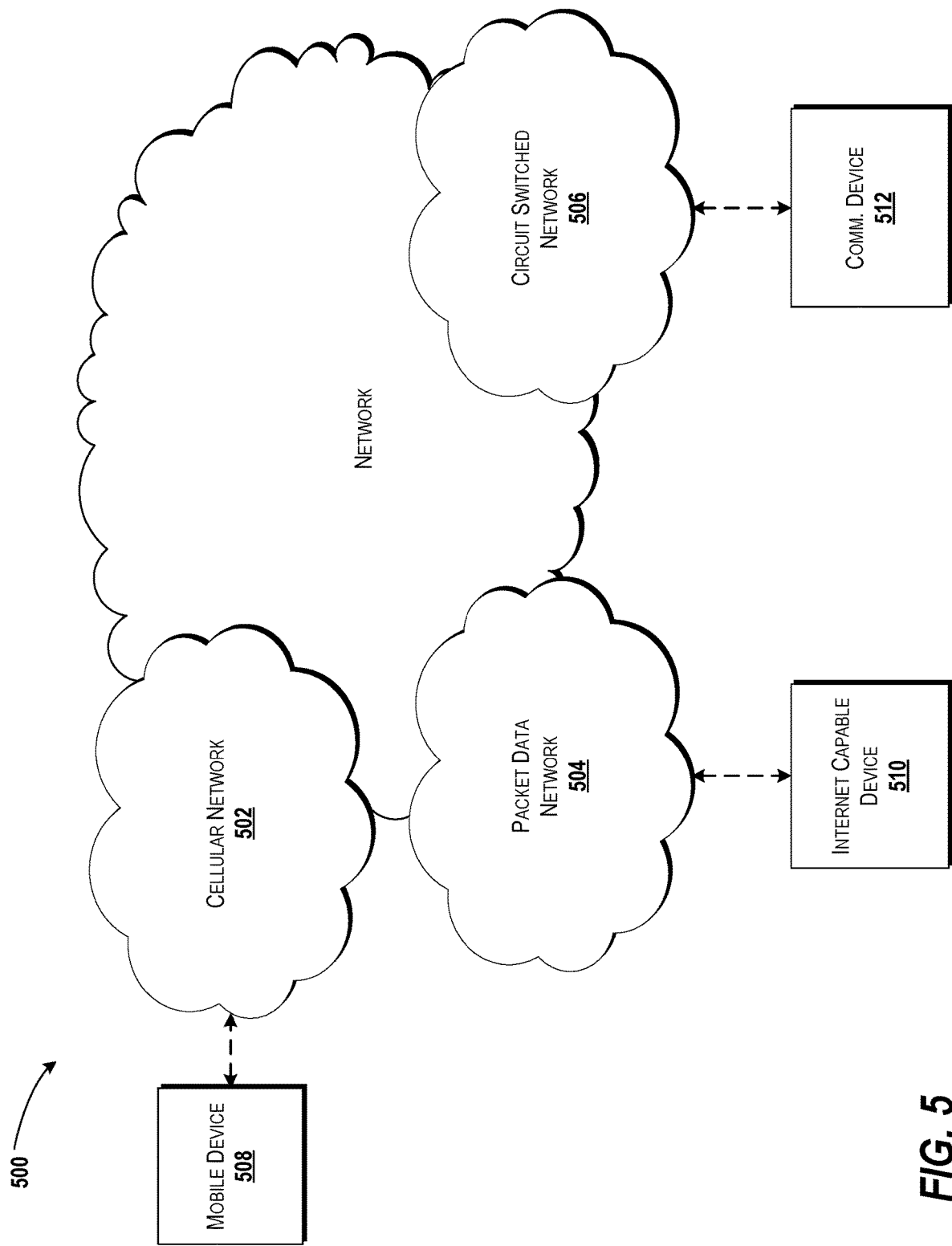
FIG. 5 schematically illustrates a network, according to an illustrative embodiment of the concepts and technologies described herein.

Turning now to FIG. 5, a discussion of a network 500 is illustrated, according to an illustrative embodiment. The network 102 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment (e.g., the UE 130), a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 102 and/or the network 500 refers broadly to any combination of the networks 502, 504, 506. It should be appreciated that substantially all of the functionality described with reference to the network 102 and/or the network 500 can be performed by the cellular network 502, the packet data network 504, and/or the circuit switched network 506, alone or in combination with other networks, network elements, and the like.

Figure 6:
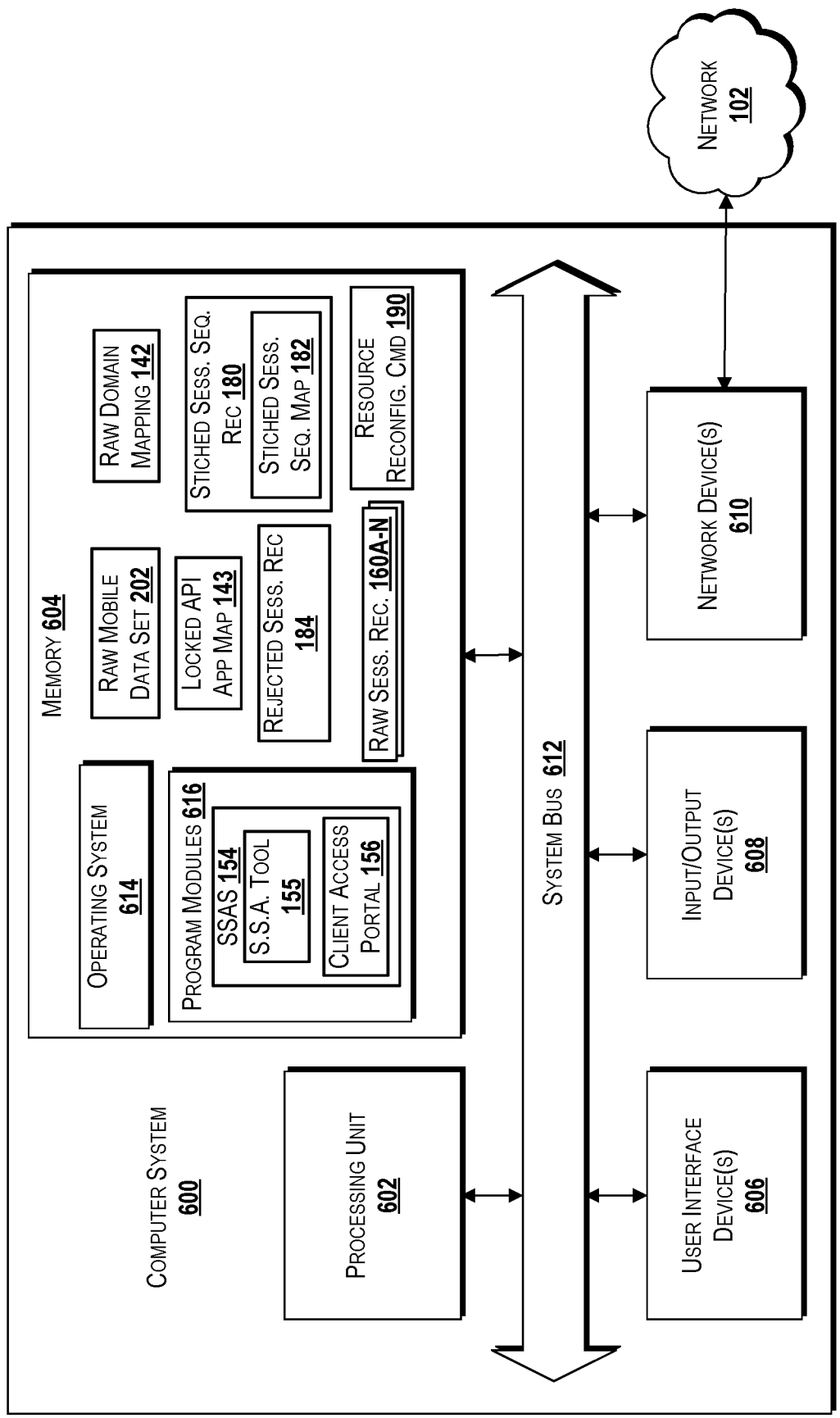
FIG. 6 is a block diagram illustrating an example computer system operable to support one or more aspects of an operating environment, according to some illustrative embodiments of the concepts and technologies described herein.

FIG. 6 is a block diagram illustrating a computer system 600 configured to provide the functionality described herein for mobile network handling of simultaneous usage sessions in accordance with various embodiments of the concepts and technologies disclosed herein. In aspects, one or more of the network session server 150, and/or the core network devices 110 (e.g., the MSP 116, the core router 118, the PGW 120, the data lake 140, the access point 104, the web servers 103, and/or the network transport resources 106) illustrated and described herein can be configured as and/or can have an architecture similar or identical to the computer system 600. In some embodiments, the UE 130 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 151 can be configured substantially similar to the processing unit 602. In some embodiments, the memory 133, the memory 153, and the data lake 140 can be configured substantially similar to the memory 604.

The processing unit 602 may be a central processor that performs arithmetic and logical operations, a more specific purpose programmable logic controller ("PLC"), a programmable gate array, or other type of processor as understood to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally understood, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the SSAS 154, the simultaneous session analysis tool 155, the client access portal 156, and/or other computer-readable instructions. These and/or other programs can be embodied in computer-readable media comprising instructions that, when executed by the processing unit 602, perform one or more of the methods 400 and 450 described in detail above with respect to FIGS. 4A and 4C, and any other operations and functions discussed herein with respect to FIGS. 1, 2, and 3. According to some embodiments, the program modules 616 may be embodied in hardware, software, firmware, or any combination thereof. It should be understood that the memory 604 also can be configured to store one or more instance of information discussed with respect to FIGS. 1, 2, and 3, such as but not limited to the raw mobile data set 202, the locked API application map 143, the rejected session record 184, the raw session records 160A-N, the raw domain mapping 142, the stitched session sequence record 180, the stitched session sequence map 182, the resource reconfiguration command 190, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 102. Examples of the network devices 610 include, but are not limited to, a modem, a radio frequency ("RF") or infrared ("IR") transceiver, a telephonic interface, a bridge, a router, or a network card. The network 102 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 102 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
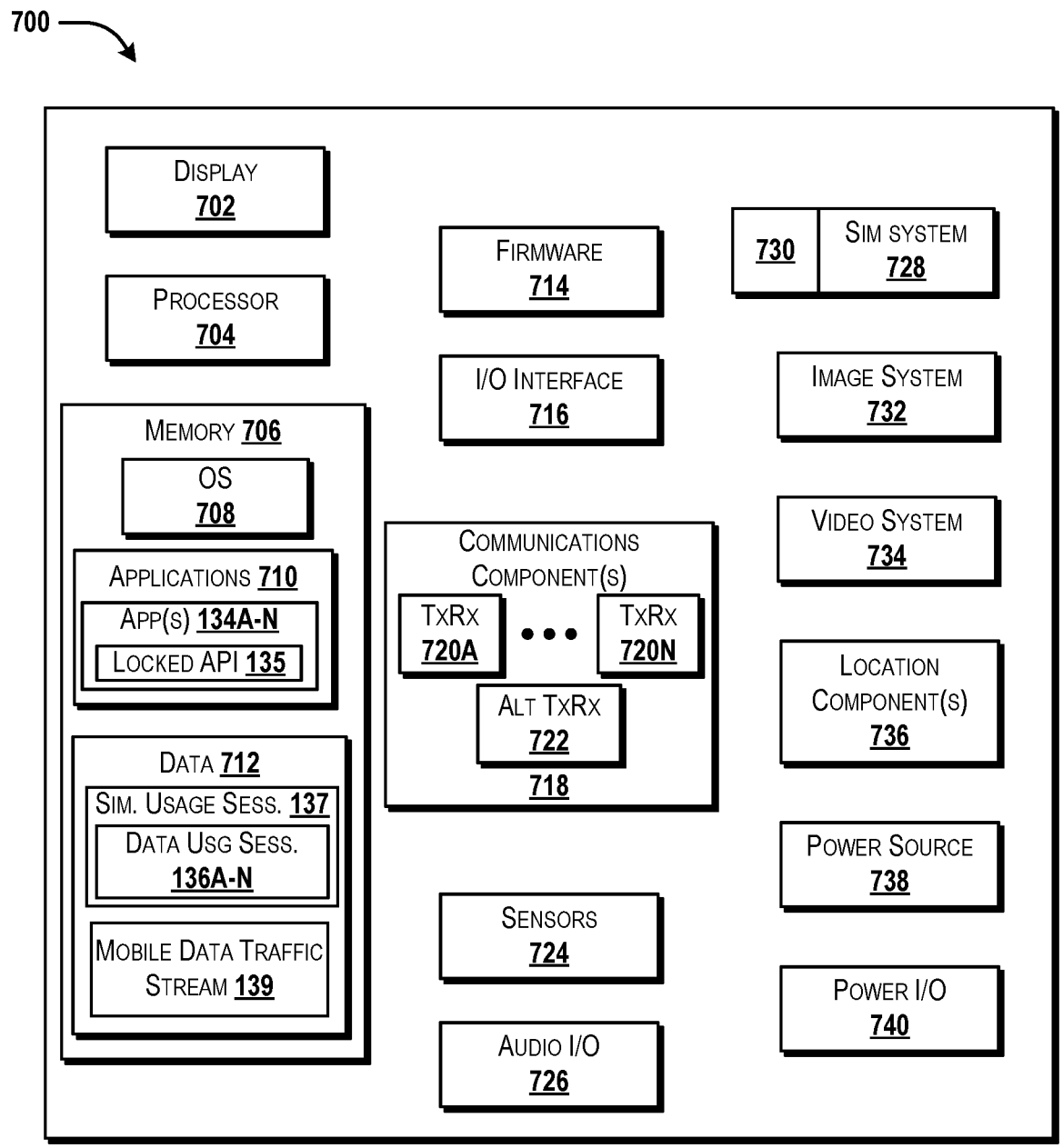
FIG. 7 is a block diagram illustrating an example user equipment, according to some illustrative embodiments of the concepts and technologies described herein.

Turning now to FIG. 7, an illustrative user equipment 700 and components thereof will be described. In some embodiments, one or more instance of the UE 130 and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to display various graphical user interface ("GUI") elements for presenting and/or modifying information associated with a custom private caller ID mask, creating private call instructions, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the applications 134A-N, the simultaneous session analysis tool 155, and/or other computer-executable instructions stored in a memory 706, or the like. In some embodiments, the applications 710 also can include a UI application (not illustrated in FIG. 7).

The UI application can interface with the operating system 708, which may be included in the UE 130 shown in FIG. 1, to facilitate user interaction with functionality and/or data stored at the user equipment 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, displaying information about the SSAS 154 via the client access portal 156, configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. In some embodiments, the applications 710 can have an application programming interface, which in some embodiments can be locked and/or unlocked, such as the locked API 135. According to various embodiments, the data 712 can include, for example, instances of the data usage sessions 136A-N, the simultaneous usage session 137, the mobile data traffic stream 139, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. The I/O interface 716 can be configured to support the input/output of data such as the mobile data traffic stream 139 and other information discussed with respect to FIG. 1, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks such as the network 102 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless communication devices as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and should not be construed as being limiting in any way.

Based on the foregoing, it should be appreciated that systems and methods for mobile network handling of simultaneous usage sessions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or medium described herein. Rather, the specific features, acts and mediums are disclosed as example forms of implementing the concepts and technologies disclosed herein.

The subject matter described above is provided by way of illustration only and should not be construed as limiting.

Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
obtaining, by a processor of a network session server, from a session probe within a core network device, a raw mobile data set associated with a user equipment;
determining, by the processor based on the raw mobile data set, that the user equipment engages in a simultaneous usage session, wherein determining that the user equipment engages in a simultaneous usage session comprises determining that at least two initiated request strings generated in response to input from a user of the user equipment are directed to different instances of web domains and that time stamps corresponding to the at least two initiated request strings occur cotemporally;
determining, by the processor based on the raw mobile data set, that an unsolicited request string occurred cotemporally with the at least two initiated request strings;
identifying, by the processor, targeted domains that are present within the raw mobile data set;
determining that the unsolicited request string does not correspond with any of the targeted domains; and
creating, by the processor, a raw session record for each of the targeted domains associated with the simultaneous usage session, wherein the unsolicited request string is omitted from creation of a raw session record.

2. The method of claim 1, wherein the simultaneous usage session comprises a plurality of data usage sessions that occur cotemporally on the user equipment.

3. The method of claim 2, wherein each of the plurality of data usage sessions includes a plurality of initiated request strings including the at least two initiated request strings and a plurality of unsolicited request strings including the unsolicited request string that are provided to a network, and wherein the plurality of initiated request strings and the plurality of unsolicited request strings from the plurality of data usage sessions are intermingled within the raw mobile data set.

4. The method of claim 1, wherein the core network device comprises one or more of a multi-service proxy, a router, a packet data network gateway, a session management function, or a user plane function.

5. The method of claim 1, further comprising:
determining, by the processor, that one or more first branch domains corresponds with a first targeted domain for the raw mobile data set;
determining, by the processor, that one or more second branch domains corresponds with a second targeted domain for the raw mobile data set;
creating, by the processor, a first targeted domain session identifier for the first targeted domain and the one or more first branch domains; and
creating, by the processor, a second targeted domain session identifier for the second targeted domain and the one or more second branch domains.

6. The method of claim 5, further comprising:
generating, by the processor, raw data records for a first raw session record based on the first targeted domain session identifier; and generating, by the processor, raw data records for a second raw session record based on the second targeted domain session identifier.

7. The method of claim 1, further comprising:
finalizing, by the processor, the raw session record for each of the targeted domains based on a respective raw session timeout period; and
in response to finalizing the raw session record for each of the targeted domains, providing, by the processor, the raw session record to a data lake that is accessible to a data tonnage assessment service and a simultaneous session analysis service.

8. A system comprising:
a processor; and
a memory that stores computer-executable instructions that, in response to being executed by the processor, cause the processor to perform operations comprising:
obtaining, from a session probe within a core network device, a raw mobile data set associated with a user equipment,
determining, based on the raw mobile data set, that the user equipment engages in a simultaneous usage session, wherein determining that the user equipment engages in a simultaneous usage session comprises determining that at least two initiated request strings generated in response to input from a user of the user equipment are directed to different instances of web domains and that time stamps corresponding to the at least two initiated request strings occur cotemporally,
identifying targeted domains that are present within the raw mobile data set,
determining that the unsolicited request string does not correspond with any of the targeted domains, and
creating a raw session record for each of the targeted domains associated with the simultaneous usage session, wherein the unsolicited request string is omitted from creation of a raw session record.

9. The system of claim 8, wherein the simultaneous usage session comprises a plurality of data usage sessions that occur cotemporally on the user equipment.

10. The system of claim 9, wherein each of the plurality of data usage sessions includes a plurality of initiated request strings including the at least two initiated request strings and a plurality of unsolicited request strings including the unsolicited request string that are provided to a network, and wherein the plurality of initiated request strings and the plurality of unsolicited request strings from the plurality of data usage sessions are intermingled within the raw mobile data set.

11. The system of claim 8, wherein the core network device comprises one or more of a multi-service proxy, a core router, a packet data network gateway, a session management function, or a user plane function.

12. The system of claim 8, wherein the operations further comprise:
determining that one or more first branch domains corresponds with a first targeted domain for the raw mobile data set;
determining that one or more second branch domains corresponds with a second targeted domain for the raw mobile data set;
creating a first targeted domain session identifier for the first targeted domain and the one or more first branch domains; and
creating a second targeted domain session identifier for the second targeted domain and the one or more second branch domains.

13. The system of claim 12, wherein the operations further comprise:
generating raw data records for a first raw session record based on the first targeted domain session identifier; and
generating raw data records for a second raw session record based on the second targeted domain session identifier.

14. The system of claim 8, wherein the operations further comprise:
finalizing the raw session record for each of the targeted domains based on a respective raw session timeout period; and
in response to finalizing the raw session record for each of the targeted domains, providing the raw session record to a data lake that is accessible to a data tonnage assessment service and a simultaneous session analysis service.

15. A computer storage medium having computer-executable instructions stored thereon that, in response to execution by a processor, cause the processor to perform operations comprising:
obtaining, from a session probe within a core network device, a raw mobile data set associated with a user equipment;
determining, based on the raw mobile data set, that the user equipment engages in a simultaneous usage session, wherein determining that the user equipment engages in a simultaneous usage session comprises determining that at least two initiated request strings generated in response to input from a user of the user equipment are directed to different instances of web domains and that time stamps corresponding to the at least two initiated request strings occur cotemporally;
identifying targeted domains that are present within the raw mobile data set;
determining that the unsolicited request string does not correspond with any of the targeted domains; and
creating a raw session record for each of the targeted domains associated with the simultaneous usage session, wherein the unsolicited request string is omitted from creation of a raw session record.

16. The computer storage medium of claim 15, wherein the simultaneous usage session comprises a plurality of data usage sessions that occur cotemporally on the user equipment.

17. The computer storage medium of claim 16, wherein each of the plurality of data usage sessions includes a plurality of initiated request strings including the at least two initiated request strings and a plurality of unsolicited request strings including the unsolicited request string that are provided to a network, and wherein the plurality of initiated request strings and the plurality of unsolicited request strings from the plurality of data usage sessions are intermingled within the raw mobile data set.

18. The computer storage medium of claim 15, wherein the operations further comprise:
determining that one or more first branch domains corresponds with a first targeted domain for the raw mobile data set;
determining that one or more second branch domains corresponds with a second targeted domain for the raw mobile data set;

creating a first targeted domain session identifier for the first targeted domain and the one or more first branch domains; and creating a second targeted domain session identifier for the second targeted domain and the one or more second branch domains.

19. The computer storage medium of claim 18, wherein the operations further comprise:

generating raw data records for a first raw session record based on the first targeted domain session identifier; and generating raw data records for a second raw session record based on the second targeted domain session identifier.

20. The computer storage medium of claim 15, wherein the operations further comprise:

finalizing the raw session record for each of the targeted domains based on a respective raw session timeout period; and in response to finalizing the raw session record for each of the targeted domains, providing the raw session record to a data lake that is accessible to a data tonnage assessment service and a simultaneous session analysis service.

* * * * *